(12) United States Patent
Fujioka et al.

(10) Patent No.: US 9,459,049 B2
(45) Date of Patent: Oct. 4, 2016

(54) METHOD FOR COOLING LIQUID

(71) Applicant: Kao Corporation, Tokyo (JP)

(72) Inventors: Toku Fujioka, Wakayama (JP); Wataru Yamauchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 154 days.

(21) Appl. No.: 14/577,984

(22) Filed: Dec. 19, 2014

(65) Prior Publication Data

US 2015/0112094 A1 Apr. 23, 2015

Related U.S. Application Data

(63) Continuation of application No. 13/518,342, filed as application No. PCT/JP2010/007134 on Dec. 8, 2010, now Pat. No. 8,961,657.

(30) Foreign Application Priority Data

Dec. 22, 2009 (JP) ................................. 2009-290972
Nov. 17, 2010 (JP) ................................. 2010-256710
Nov. 17, 2010 (JP) ................................. 2010-256711

(51) Int. Cl.
 *F28C 3/08* (2006.01)
 *B01D 19/00* (2006.01)

(52) U.S. Cl.
 CPC ................. *F28C 3/08* (2013.01); *B01D 19/00* (2013.01)

(58) Field of Classification Search
 CPC ................................. F28C 3/08; B01D 19/00

USPC .................. 95/156, 172, 175, 228, 241, 266
See application file for complete search history.

(56) References Cited

U.S. PATENT DOCUMENTS

| 6,538,164 B1 | 3/2003 | Gallagher et al. |
| 2008/0251215 A1 | 10/2008 | Chen |
| 2011/0294978 A1 | 12/2011 | Diener et al. |

FOREIGN PATENT DOCUMENTS

| JP | 47-40445 | 12/1972 |
| JP | 59-111914 A | 6/1984 |
| JP | 59-186669 U | 12/1984 |
| JP | 2-218656 A | 8/1990 |
| JP | 5-49801 A | 3/1993 |
| JP | 8-325321 A | 12/1996 |
| JP | 2589365 B2 | 12/1996 |

(Continued)

OTHER PUBLICATIONS

English machine translation of the Claims and Specification for JP-2005-161139-A, dated Jun. 23, 2005.

(Continued)

*Primary Examiner* — Robert A Hopkins
(74) *Attorney, Agent, or Firm* — Birch, Stewart, Kolasch & Birch, LLP

(57) ABSTRACT

In a method for cooling liquid, when a liquid containing a volatile component and a surfactant is supplied to an atmosphere having a pressure which is lower than or equal to the saturated vapor pressure of the volatile component so that at least a portion of the volatile component is vaporized, whereby the liquid is cooled, a gas other than the volatile component is introduced into the atmosphere having the pressure so that the gas contacts the liquid.

11 Claims, 7 Drawing Sheets

(56) References Cited

FOREIGN PATENT DOCUMENTS

| | | |
|---|---|---|
| JP | 11-172293 A | 6/1999 |
| JP | 11-172294 A | 6/1999 |
| JP | 2000-96084 A | 4/2000 |
| JP | 2004-359871 A | 12/2004 |
| JP | 2005-161139 A | 6/2005 |
| JP | 2007-252383 A | 10/2007 |
| JP | 2009-161606 A | 7/2009 |
| JP | 2012-516770 A | 7/2012 |

OTHER PUBLICATIONS

English machine translation of the Claims and Specification for JP-2009-161606-A, dated Jul. 23, 2009.
International Preliminary Report on Patentability for International Patent Application No. PCT/JP2010/007134; mailed on Jul. 12, 2012.
International Search Report issued in PCT/JP2010/007134 dated Apr. 5, 2011.
The Communication pursuant to Rule 164(1) EPC and partial supplemental European search report, dated Nov. 28, 2014, issued in the corresponding European Patent Application No. 10838892.7.

(a)

(b)

(c)

METHOD FOR COOLING LIQUID

CROSS-REFERENCE TO RELATED APPLICATIONS

This application is a Continuation of co-pending application Ser. No. 13/518,342 filed on Jun. 21, 2012, which is a National Phase of PCT International Application No. PCT/JP2010/007134 filed on Dec. 8, 2010, which claims priority under 35 U.S.C. §119(a) to Patent Application No. 2009-290972 filed in Japan on Dec. 22, 2009, Patent Application No. 2010-256710 filed in Japan on Nov. 17, 2010, and Patent Application No. 2010-256711 filed in Japan on Nov. 17, 2010. All of the above applications are hereby expressly incorporated by reference into the present application.

TECHNICAL FIELD

The present invention relates to methods for cooling liquids and methods for manufacturing anionic surfactant aqueous solutions cooled in the cooling methods.

BACKGROUND ART

A commonly known method for cooling a liquid containing a volatile component is to supply the liquid to an atmosphere having a pressure which is lower than or equal to the saturated vapor pressure of the volatile component so that at least a portion of the volatile component is vaporized, whereby the liquid is cooled. In this case, if the liquid is low viscous or non-foaming, bubbles of the vaporized volatile component easily move upward in the liquid to reach the gas-liquid interface, and thereafter, burst and are released into the gas phase.

However, if the liquid is a foaming liquid containing a surfactant, bubbles which have reached the gas-liquid interface do not easily burst. Moreover, if the liquid is viscous, bubbles are retained or entrained in the liquid to form foam like shaving cream or meringue, resulting in a disadvantageous decrease in the density and flowability of the liquid.

To address these problems, methods of reducing the formation of foam and removing foam using a defoamer are known. However, defoamers often cannot be used in the fields of surfactants, sugars, thickener aqueous solutions, foods, etc.

Therefore, as a method for defoaming without using a defoamer, for example, PATENT DOCUMENT 1 describes a method of blowing, onto the surface of a liquid, a gas having a lower temperature than the solution temperature. PATENT DOCUMENT 2 describes a method of, when blowing a liquid into an evaporator, evaporating the liquid in a pipe to produce a gas-liquid two-phase state, thereby reducing the formation of foam.

PATENT DOCUMENTS 3 and 4 describe a method of supplying a liquid to a degassing device where the pressure has been reduced and cooling the liquid as the liquid flows down along the inner wall surface of the degassing device, thereby condensing bubbles.

As a method for manufacturing an anionic surfactant, for example, PATENT DOCUMENT 5 describes a method of circulating an alkyl sulfate aqueous solution in a circulation path, continuously supplying alkyl sulfate and an alkali which are materials to the alkyl sulfate aqueous solution circulating in the circulation path to cause neutralization, and at the same time, continuously collecting a portion of the alkyl sulfate aqueous solution circulating in the circulation path as a product, and cooling the alkyl sulfate aqueous solution using a heat exchanger provided and inserted in the circulation path.

PATENT DOCUMENT 6 describes that by flashing a mixture obtained by contacting a sulfated material and a basic material together, the mixture is separated into a gas-phase component and a liquid-phase component, and the liquid-phase component is collected.

PATENT DOCUMENT 7 describes that an acid solution containing an acid precursor of an anionic surfactant and an alkali solution for neutralization are continuously supplied to a thin film evaporator to form a thin film of the mixture solution thereof on the heated inner wall of the evaporator while being subjected to neutralization and condensation/drying in parallel under reduced pressure.

PATENT DOCUMENT 8 describes a method for manufacturing alkyl ether sulfate in which alkyl ether is sulfated, followed by degassing under reduced pressure and then neutralization in a closed continuous scheme using an external cooling device.

CITATION LIST

Patent Documents

PATENT DOCUMENT 1: Japanese Patent Publication No. 59-111914

PATENT DOCUMENT 2: Japanese Patent Publication No. H05-49801

PATENT DOCUMENT 3: Japanese Patent Publication No. 2007-252383

PATENT DOCUMENT 4: Japanese Patent Publication No. 2005-161139

PATENT DOCUMENT 5: Japanese Patent Publication No. H02-218656

PATENT DOCUMENT 6: Japanese Patent Publication No. 2000-96084

PATENT DOCUMENT 7: Japanese Patent Publication No. H11-172294

PATENT DOCUMENT 8: Japanese Patent Publication No. 2004-359871

SUMMARY OF THE INVENTION

In a method for cooling liquid according to the present invention, when a liquid containing a volatile component and a surfactant is supplied to an atmosphere having a pressure which is lower than or equal to the saturated vapor pressure of the volatile component so that at least a portion of the volatile component is vaporized, whereby the liquid is cooled, a gas other than the volatile component is introduced into the atmosphere having the pressure so that the gas contacts the liquid.

In a method for manufacturing a cooled anionic surfactant aqueous solution according to the present invention, an anionic surfactant aqueous solution obtained by neutralization of an acid precursor of an anionic surfactant with an alkali is cooled in the method for cooling liquid of the present invention, where the volatile component is water and the surfactant is the anionic surfactant.

Another method for cooling liquid according to the present invention is a method for cooling a liquid containing a volatile component and a surfactant by supplying the liquid to an atmosphere having a pressure which is lower than or equal to the saturated vapor pressure of the volatile component and thereby vaporizing at least a portion of the volatile component. A flying time of the liquid is 0.030 sec or more, which is defined as a value obtained by dividing a flying distance of the liquid by an initial speed of the liquid represented as follows.

The liquid initial speed=a volume flow rate of the liquid during supply/a supply area of the liquid (I)

In another method for manufacturing a cooled anionic surfactant aqueous solution according to the present invention, an anionic surfactant aqueous solution obtained by neutralization of an acid precursor of an anionic surfactant with an alkali is cooled in the other method for cooling liquid of the present invention, where the volatile component is water and the surfactant is the anionic surfactant.

DESCRIPTION OF EMBODIMENTS

First Embodiment (Method for Cooling Liquid)

Figure 1:
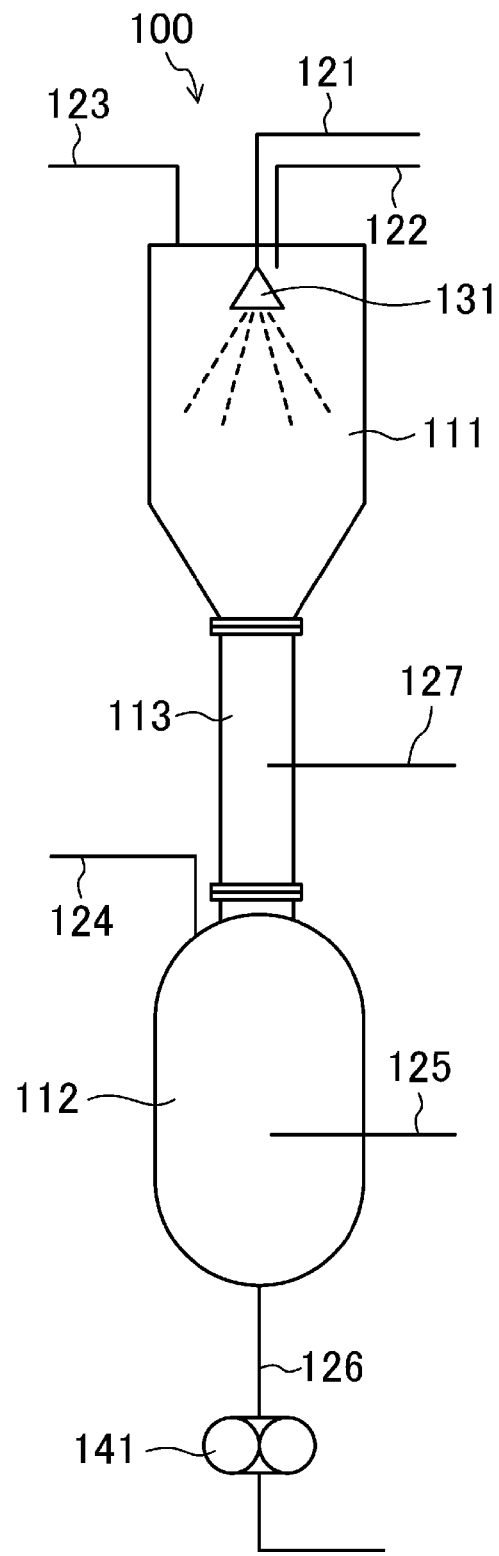
FIG. 1 is a diagram showing a configuration of a cooling device according to a first embodiment.

A method for cooling liquid according to a first embodiment is as follows. When a liquid containing a volatile component and a surfactant is supplied to a cooling zone of an atmosphere having a pressure which is lower than or equal to the saturated vapor pressure of the volatile component so that at least a portion of the volatile component is vaporized, whereby the liquid is cooled, a gas other than the volatile component is introduced into the cooling zone in the atmosphere having the pressure so that the gas contacts the liquid.

In general, when a liquid containing a volatile component and a surfactant is supplied to a cooling zone of an atmosphere having a pressure which is lower than or equal to the saturated vapor pressure of the volatile component so that at least a portion of the volatile component is vaporized, whereby the liquid is cooled, then if the liquid has foaming or viscous properties, bubbles are retained or entrained in the liquid to form foam like shaving cream or meringue, and therefore, the liquid after cooling has a lower density. In the cooling zone of the atmosphere having the pressure which is lower than or equal to the saturated vapor pressure of the volatile component, the temperature of the gas in the bubbles retained or entrained in the liquid is the boiling point. Therefore, if even a small pressure is applied using, for example, an evacuation pump, the bubbles condense, whereby the liquid can approach the true density. However, if the density of the liquid (the density of the liquid containing gas) is low, the cooling zone needs to have a large volume and also needs to have a height sufficient to prevent cavitation. Moreover, if the density of the liquid is low, the flowability of the liquid is low, and therefore, for example, a larger-size evacuation pump is required, leading to an increase in cost.

In this situation, in the method of blowing, onto the surface of a liquid, a gas having a lower temperature than the solution temperature (see PATENT DOCUMENT 1), it takes a time for bubbles to move upward to reach the liquid surface, and therefore, means for storing and retaining the liquid is required, and this method is not applicable to viscous liquids in which bubbles move upward at considerably low speed. In the method of, when blowing a liquid into an evaporator, evaporating the liquid in a pipe to produce a gas-liquid two-phase state (see PATENT DOCUMENT 2), it is necessary to heat the liquid before being supplied to the evaporator, and therefore, this method is not applicable to liquids having low thermal stability. Also, the flow state needs to be an intermittent flow or an annular flow, and therefore, the operating ranges of the pressure and the temperature are disadvantageously limited. In the method of supplying a liquid to a degassing device where the pressure has been reduced and cooling the liquid as the liquid flows down along the inner wall surface of the degassing device (see PATENT DOCUMENTS 3 and 4), the heat transfer coefficient of the liquid in which bubbles are retained or entrained is reduced, and therefore, it is considerably inefficient to cool the liquid using the inner wall surface as a heat transfer surface.

However, according to the method for cooling liquid of the first embodiment, when the liquid is cooled as described above, a gas other than the volatile component is introduced to contact the liquid, whereby bubbles retained or entrained in the liquid can be removed without the above drawbacks and regardless of the use or nonuse of a defoamer. Therefore, it is possible to reduce or prevent contamination of the liquid after cooling with impurities.

The method for cooling liquid of the first embodiment may be carried out in a continuous, batch, or semibatch mode.

In the continuous mode, for example, an evacuation pump may be provided in a lower portion of a cooling device to which a liquid is supplied, and the liquid after cooling may be continuously discharged from the cooling device, whereby the liquid can be cooled. In this case, the resulting liquid can have a higher density, and therefore, a net positive suction head available (NPSHav) becomes larger for the evacuation pump, whereby cavitation can be reduced or prevented. Also, the surface of the liquid stored and retained in the device can be maintained at a lower height, whereby the height of the device can be reduced, and therefore, the cost can be reduced. Therefore, the method for cooling liquid of the first embodiment is particularly preferable to the continuous mode.

In the batch mode, a liquid having a higher density can be obtained, and therefore, the amount of the liquid processed per unit operation can be increased. Also, the volume of the device can be reduced, resulting in an economic benefit. Moreover, compared to a cooling method using a heat exchanger which is generally most frequently employed, pressure loss can be reduced. This pressure loss reduction becomes more significant as the viscosity of the liquid increases. Also, it is no longer necessary to increase the size of the flow path in order to reduce pressure loss, for example, and therefore, the volume of the device can be reduced, resulting in space savings.

Note that the method for cooling liquid of the first embodiment is effective not only in cooling, but also in condensation and removal of impurities because the volatile component is vaporized.

<Liquid>

The liquid is not particularly limited. Examples of the liquid for which the gas introduction has a particularly significant defoaming effect include viscous liquids and foaming liquids. The liquid also includes fluids (slurries) which contain solid particles and fluids (pastes) which have a high viscosity and may or may not contain solid particles. The liquid also includes fluids (bubble-entrained fluids) which contain or entrain bubbles such as air in the liquid.

The liquid includes at least a volatile component and a surfactant which imparts viscous or foaming properties to the liquid.

Examples of the volatile component include water, organic solvents, etc. Examples of the organic solvent include: alcohols such as methanol, ethanol, and isopropyl alcohol; ketones such as acetone and methyl ethyl ketone; esters such as methyl acetate and ethyl acetate; aliphatic hydrocarbons such as normal hexane; alicyclic hydrocarbons such as cyclohexane; aromatic hydrocarbons such as toluene and xylene; chlorimated aliphatic hydrocarbons such as dichloromethane and chloroform; and the like. The volatile component may be a single species or a mixture of two or more different species.

The surfactant may be a single species or a mixture of two or more different species. The content of the surfactant is, for example, 0.1 to 90 mass %. The defoaming effect is particularly significant for high-viscosity fluids and high-viscosity fluids (bubble-entrained fluids) containing or entraining bubbles such as air in the liquid. In this regard, the content of the surfactant is preferably 10 to 99 mass %, more preferably 30 to 95 mass %, even more preferably 50 to 90 mass %, and still even more preferably 55 to 85 mass %.

Examples of the surfactant include anionic surfactants, nonionic surfactants, cationic surfactants, amphoteric surfactants, amphiphilic polymers, etc.

Examples of the anionic surfactant include: sulfuric acid ester type such as alkyl sulfate and polyoxyethylene alkyl ether sulfate; sulfonic acid type such as alkyl benzene sulfonate; carboxylic acid type; phosphoric acid ester type; and the like. When these anionic surfactants are mixed with water, the viscosity of the mixture increases and therefore the flowability decreases and eventually disappears with increasing concentration of the surfactant until a certain surfactant concentration. If the surfactant concentration further increases from the concentration, the mixture forms paste and the flowability reappears. This is commonly known. For such paste mixture, the gas introduction has a particularly significant defoaming effect.

Examples of the nonionic surfactant include: ether type such as polyoxyethylene alkyl ether; ester type such as glycerin fatty acid ester, sorbitan fatty acid ester, and sucrose fatty acid ester; ester-ether type such as polyoxyethylene sorbitan fatty acid ester; alkanolamide type such as alkyl alkanolamide; and the like.

Examples of the cationic surfactant include quaternary ammonium salt type, alkyl amine salt, etc.

Examples of the amphoteric surfactant include: carboxybetaine type such as alkyl betaine; amine oxide type such as alkyl amine oxide; and the like.

The amphiphilic polymer is a polymer having both hydrophobic and hydrophilic groups. For example, the amphiphilic polymer may be synthesized by copolymerization of a reactive surfactant and a hydrophilic monomer or copolymerization of an ionic hydrophilic monomer and a hydrophobic monomer. Note that the reactive surfactant is a surfactant having a polymerizable unsaturated double bond, or an ionic hydrophilic group and a hydrophobic group, in the molecule.

The liquid may further contain components for respective applications, etc.

The viscosity of the liquid is, for example, 0.01 to 1000 Pa·s. The viscosity of the liquid may be measured by a double coaxial cylinder viscometer.

Specific examples of the liquid include surfactant aqueous solutions, slurries containing a detergent composition, thickener aqueous solutions, liquids containing foods (sugars, chocolate, processed soybean milk, etc.), and the like.

The liquid before cooling may contain or entrain bubbles. When the bubble-entrained liquid is supplied to the cooling zone of an atmosphere having a pressure which is lower than or equal to the saturated vapor pressure of the volatile component, gas in the bubbles is expanded and is also pushed out and removed by the vaporized volatile component. Therefore, by using the bubble-entrained liquid, a liquid having a higher density than before cooling, and excellent flowability, can be obtained.

<Pressure and Temperature>

The pressure of the cooling zone to which the liquid is supplied is set to be lower than or equal to the saturated vapor pressure of the volatile component at the temperature of the cooling zone. In this case, typically, the cooling zone is desirably formed of an atmosphere having a pressure equal to the saturated vapor pressure of the volatile component at the temperature. If the volatile component is not cooled to a desired temperature due to boiling-point elevation, the atmosphere having the pressure is preferably set to have a pressure which is lower than the saturated vapor pressure. Note that the saturated vapor pressure of water at 25° C. is 3.17 kPa.

The temperature of the cooling zone is, for example, −20 to 200° C., but depending on the composition of the liquid supplied to the cooling zone.

<Operation of Supplying Liquid>

The temperature of the cooling zone is, for example, 0 to 220° C., but depending on the composition of the liquid supplied to the cooling zone. The liquid does not necessarily need to be previously heated, etc. Therefore, the method for cooling liquid of the first embodiment may be satisfactorily applicable to materials having poor thermal stability.

Means for supplying the liquid to the cooling zone is not particularly limited. Atomization means such as a spray nozzle is preferably used.

When the atomization means is used to supply the liquid to the cooling zone, the direction in which the liquid is supplied is preferably, but not particularly limited to, a downward direction (from top to bottom). The droplet diameter of the liquid is preferably 1 to 10000 μm. If it is difficult to spray the liquid in the form of droplets due to high viscosity, the liquid may be supplied in the form of film or bar. In this case, the thickness of the liquid film is preferably 1 to 10000 μm.

The liquid may be supplied to the cooling zone from a single point or a plurality of points. In particular, when the liquid has a high viscosity and therefore would cause large pressure loss, the liquid is preferably supplied from a plurality of points.

<Gas>

The gas introduced into the cooling zone is a gas other than the volatile component contained in the liquid. The introduced gas is not particularly limited unless the gas is reactive to the liquid. If reduced pressure is desirable, the introduced gas is preferably a condensable gas in order to reduce the load of a condenser and a vacuum pump. Specifically, the introduced gas is, for example, steam (water vapor), etc. If the volatile component is water, the introduced gas is air, nitrogen, etc., for example. The gas introduced into the cooling zone may be a single species or a mixture of two or more different species.

In addition to the gas introduced into the cooling zone, the volatile component contained in the liquid may be simultaneously introduced. In this case, the content of the volatile component with respect to all gases is preferably 20 mass % or less. In order to reduce the partial pressure of the volatile component in the atmosphere having the pressure of the cooling zone to accelerate defoaming, the volatile component content is more preferably 5 mass % or less, even more preferably 1 mass % or less or zero mass %.

<Operation of Introducing Gas>

The temperature of the gas introduced into the cooling zone is, for example, but not particularly limited to, 0 to 200° C.

The amount of the gas introduced into the cooling zone is, but not particularly limited to, 0.0001 to 10 mass % with respect to the amount of the supplied liquid. In order to reduce the load of the condenser and the vacuum pump, the introduced gas amount is more preferably 2 mass % or less, even more preferably 1 mass % or less.

The direction in which the gas is introduced into the cooling zone may be, but is not particularly limited to, a direction which is opposite to the direction in which the liquid is supplied and in which the gas contacts the liquid in a counter-current manner, or a direction which is the same as the direction in which the liquid is supplied and in which the gas contacts the liquid in a co-current manner.

In order to increase the area of gas-liquid interface to achieve efficient defoaming, the gas is preferably introduced into the cooling zone so that the gas contacts the liquid before the liquid supplied to the device (cooling zone) containing the atmosphere having the pressure which is lower than or equal to the saturated vapor pressure of the volatile component reaches the inner wall of the device or the surface of the liquid stored and retained in the device. Therefore, the gas is preferably introduced directly to the liquid supply inlet in the cooling zone. Note that the gas may be introduced into the cooling zone so that the gas contacts the liquid after the liquid reaches the inner wall of the device or the surface of the liquid stored and retained in the device.

The gas may be introduced into the cooling zone from a single point or a plurality of points. In particular, when the liquid is supplied from a plurality of points, the gas is also preferably introduced from a plurality of points in order to allow the gas and the liquid to efficiently contact each other.

<Cooling Device>

FIG. 1 shows an example cooling device 100 which can be used in the method for cooling liquid of the first embodiment.

In the cooling device 100, an upper vessel 111 and a lower vessel 112 are vertically arranged, and a lower portion of the upper vessel 111 and an upper portion of the lower vessel 112 are connected together by a connecting pipe 113 extending vertically.

A liquid supply pipe 121, a first gas introduction pipe 122, and a first gas discharge pipe 123 are connected to a top plate portion at an upper portion of the upper vessel 111. The liquid supply pipe 121, the first gas introduction pipe 122, and the first gas discharge pipe 123 penetrate into the top plate portion of the upper vessel 111 and each have an opening facing downward. The liquid supply pipe 121 may be provided at other positions of the upper vessel 111. In order to increase the flying time of the supplied liquid to accelerate defoaming, the liquid supply pipe 121 is preferably provided in the top plate portion at the upper portion of the upper vessel 111. The volume of the upper vessel 111 is, for example, 1 to 10000 L.

A spray nozzle 131 is attached to a tip of the liquid supply pipe 121. A method of supplying the liquid to the upper vessel 111 is not particularly limited. In order to increase the gas-liquid interface area to improve cooling efficiency, it is preferable to use atomization means such as the spray nozzle 131, as described above. As the atomization means, the spray nozzle 131 is preferable because it does not require the power for the atomization and is energy-saving and easy to maintain. The spray nozzle 131 is commercially available from, for example, Spraying Systems Co., Japan under the trade names "Spiral Jet Spray Nozzle" and "Full Jet Spray Nozzle" and from H. IKEUCHI Co. LTD. under the trade names "Hollow Cone Nozzle (AAP series)" and "Full Cone Nozzle (AJP series)." Examples of other atomization means include: those which perform atomization using pressure energy, such as spray valves; those which perform atomization using gas energy, such as two-fluid nozzles; those which perform atomization using centrifugal force, such as rotary spray pores and rotary disks; those which perform atomization using vibration energy such as nozzle vibration and ultrasonic wave; and the like. The spray nozzle 131 may be a type of full cone nozzle or hollow cone nozzle.

A second gas discharge pipe 124 is connected to an upper portion of the lower vessel 112. The second gas discharge pipe 124 has an opening facing downward. A second gas introduction pipe 125 is connected to a middle portion of the lower vessel 112. The second gas introduction pipe 125 penetrates into the middle portion and has an opening facing horizontally. A liquid discharge pipe 126 is connected to a lower portion (bottom portion) of the lower vessel 112. An evacuation pump 141 is provided and inserted in the liquid discharge pipe 126. The volume of the lower vessel 112 is, for example, 1 to 10000 L.

Here, when the liquid is cooled in a continuous mode, the NPSHav is preferably set to be larger than the net positive suction head required (NPSHre) of the evacuation pump 141, thereby reducing or preventing cavitation, and the length of the liquid discharge pipe 126 between the lower vessel 112 and the evacuation pump 141 is preferably set to be sufficient so that the discharge flow rate can be controlled to maintain the surface of the cooled liquid in the liquid discharge pipe 126 or in the lower vessel 112. In this case, as a detector for detecting the surface of the liquid, for example, a differential pressure level meter, an ultrasonic level meter, a radar level meter, etc. may be used. When the liquid is cooled in a batch or semibatch mode, the liquid discharge pipe 126 does not necessarily need to be connected to the lower portion (bottom portion) of the lower vessel 112.

A third gas introduction pipe 127 is connected to a middle portion of the connecting pipe 113. The third gas introduction pipe 127 penetrates into the middle portion and has an opening facing horizontally. The connecting pipe 113 has, for example, a length of 50 to 10000 mm and an inner diameter of 10 to 1000 mm.

Note that the cooling device 100 may be provided with thermal insulating means for keeping the heat of the liquid in the device, such as a hot-water jacket and an electric trace.

In the method for cooling liquid of the first embodiment using the cooling device 100, the liquid is supplied from the liquid supply pipe 121 through the spray nozzle 131 to the upper vessel 111. The liquid supplied to the device is cooled to a temperature which provides the saturated vapor pressure of the volatile component (i.e., the boiling point under the pressure) in the cooling zone of an atmosphere having a pressure which is lower than or equal to the saturated vapor pressure of the volatile component. On the other hand, the gas is introduced into the device through any of the first to third gas introduction pipes 122, 125 and 127, and is discharged from the device through any of the first and second gas discharge pipes 123 and 124.

In this case, when the second gas introduction pipe 125 is used to introduce the gas into the device and the first gas discharge pipe 123 is used to discharge the gas from the device, the gas introduced into the device flows from the lower vessel 112 via the connecting pipe 113 to the upper vessel 111, i.e., the gas flows in a direction opposite to the flow direction of the liquid, and therefore, the gas and the liquid contact each other in a counter-current manner (hereinafter referred to as "gas-liquid counter-current contact conditions 1"). Similarly, when the second gas introduction pipe 125 is used to introduce the gas into the device and the second gas discharge pipe 124 is used to discharge the gas from the device, the gas introduced into the device flows upward (from bottom to top) in the lower vessel 112, i.e., the gas flows in a direction opposite to the flow direction of the liquid, and therefore, the gas and the liquid contact each other in a counter-current manner (hereinafter referred to as "gas-liquid counter-current contact conditions 2"). When the third gas introduction pipe 127 is used to introduce the gas into the device and the first gas discharge pipe 123 is used to discharge the gas from the device, the gas introduced into the device flows from the connecting pipe 113 to the upper vessel 111, i.e., the gas flows in a direction opposite to the flow direction of the liquid, and therefore, the gas and the liquid contact each other in a counter-current manner (hereinafter referred to as "gas-liquid counter-current contact conditions 3"). Note that, under the gas-liquid counter-current contact conditions 1 and 3, the liquid supplied through the liquid supply pipe 121 and the spray nozzle 131 to the upper vessel 111, is allowed to contact the gas in a counter-current manner before the liquid collides with the inner walls of the upper vessel 111 and the connecting pipe 113. Under the gas-liquid counter-current contact conditions 2 and 3, the liquid which has collided with the inner walls of the upper vessel 111 and the connecting pipe 113 and fallen into the lower vessel 112 is allowed to contact the gas in a counter-current manner.

When the first gas introduction pipe 122 is used to introduce the gas into the device and the second gas discharge pipe 124 is used to discharge the gas from the device, the gas introduced into the device flows from the upper vessel 111 through the connecting pipe 113 to the lower vessel 112, i.e., the gas and the liquid flow in the same direction, and therefore, the gas and the liquid contact together in a co-current manner (hereinafter referred to as "gas-liquid co-current contact conditions 1"). Similarly, when the third gas introduction pipe 127 is used to introduce the gas into the device and the second gas discharge pipe 124 is used to discharge the gas from the device, the gas introduced into the device flows from the connecting pipe 113 to the lower vessel 112, i.e., the gas and the liquid flow in the same direction, and therefore, the gas and the liquid contact together in a co-current manner (hereinafter referred to as "gas-liquid co-current contact conditions 2").

The relationship between the gas introduction position and the gas discharge position is not particularly limited. In order to reduce the partial pressure of the volatile component in the atmosphere having the pressure in the device (cooling zone) to accelerate defoaming, the gas-liquid counter-current contact conditions are more preferable than the gas-liquid co-current contact conditions. In order to allow the gas to contact the liquid before the liquid supplied into the device (cooling zone) containing the atmosphere having the pressure which is lower than or equal to the saturated vapor pressure of the volatile component reaches the inner wall of the device or the surface of the liquid stored and retained in the device, whereby the gas-liquid interface area is increased to achieve efficient defoaming, the gas-liquid counter-current contact conditions 1 and 3 are most preferable.

Note that a cooling device which can be used in the method for cooling liquid of the first embodiment is not limited to that shown in FIG. 1. Any device that includes at least a vessel, and a liquid supply unit, a gas introduction unit, and a gas discharge unit each of which is connected to the vessel, may be used.

(Method for Manufacturing Cooled Anionic Surfactant Aqueous Solution)

In a method for manufacturing a cooled anionic surfactant aqueous solution according to the first embodiment, an anionic surfactant aqueous solution which is obtained by neutralization of an acid precursor of an anionic surfactant with an alkali, is cooled in the method for cooling liquid of the first embodiment, where the volatile component is water and the surfactant is the anionic surfactant.

As the cooled anionic surfactant aqueous solution manufacturing method of the first embodiment, a method of circulating an anionic surfactant aqueous solution to manufacture an anionic surfactant in a continuous mode will be described hereinafter. Note that the cooled anionic surfactant aqueous solution manufacturing method of the first embodiment is not limited to this. The method may be carried out in a batch or semibatch mode.

Figure 2:
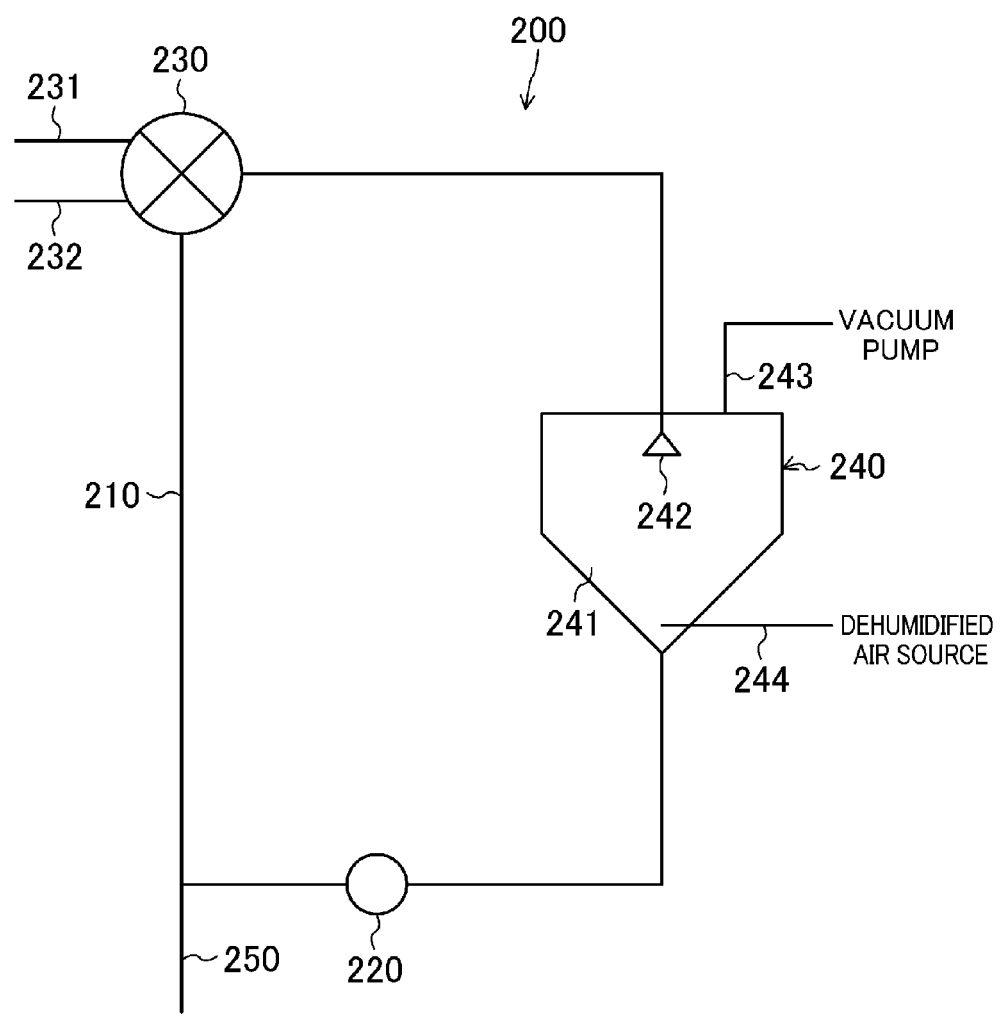
FIG. 2 is a diagram showing a configuration of a neutralization device according to the first embodiment.

FIG. 2 shows an example neutralization device 200 which can be used in the manufacture of the anionic surfactant aqueous solution of the first embodiment.

The neutralization device 200 includes a circulation path 210 and a circulation pump 220 which is provided and inserted in the circulation path 210. The circulation path 210 is filled with an anionic surfactant aqueous solution, and the circulation pump 220 sends and circulates the anionic surfactant aqueous solution in the circulation path 210.

A material mixer 230 is provided and inserted in the circulation path 210 downstream of the circulation pump 220. An acid supply pipe 231 which is used to supply the acid precursor of the anionic surfactant (raw material) and an alkali supply pipe 232 which is used to supply the alkali are connected to the material mixer 230. The material mixer 230 is not particularly limited if it is of continuous type, and may be of drive type or static type. Of these types, the drive type is more preferable in order to reduce pressure loss and sufficiently mix. The material mixer 230 is used to mix the acid precursor of the anionic surfactant from the acid supply pipe 231 and the alkali from the alkali supply pipe 232 together with the anionic surfactant aqueous solution circulating in the circulation path 210 for the purpose of neutralization, and thereafter, continuously supply the resulting mixture back to the circulation path 210. Therefore, the material mixer 230, the acid supply pipe 231, and the alkali supply pipe 232 constitute a material supply unit.

A heat removal cooler 240 is provided and inserted in the circulation path 210 downstream of the material mixer 230 and upstream of the circulation pump 220. Elevation from the heat removal cooler 240 to the circulation pump 220 is designed so that the NPSHav is greater than or equal to the NPSHre of the circulation pump 220. The heat removal cooler 240 includes a cooling tank 241 to which the circulation path 210 is connected at an upper portion and a lower portion thereof. A spray nozzle 242 is provided in an upper portion of the cooling tank 241. The spray nozzle 242 is attached to a tip of a pipe which is extended from the circulation path 210 connected to a tank upper portion of the cooling tank 241. A gas discharge pipe 243 extended from a vacuum pump (not shown) is connected to a tank upper portion (top plate) of the cooling tank 241, and a gas introduction pipe 244 extended from a heat removal air source (not shown) is connected to a tank lower portion of the cooling tank 241. The heat removal cooler 240 sprays the anionic surfactant aqueous solution from the spray nozzle 242 into the cooling tank 241 which has been evacuated through the gas discharge pipe 243 to provide a cooling zone of an atmosphere having a pressure which is lower than or equal to the saturated vapor pressure of water, whereby at least a portion of water contained in the anionic surfactant aqueous solution is vaporized to cool the anionic surfactant aqueous solution. Therefore, the heat removal cooler 240 serves as a cooling unit. Also, dehumidified air is introduced through the gas introduction pipe 244 to defoam the anionic surfactant aqueous solution.

A product collection pipe 250 is connected to the circulation path 210 downstream of the heat removal cooler 240 and the circulation pump 220 and upstream of the material mixer 230. The product collection pipe 250 is used to continuously collect a portion of the anionic surfactant aqueous solution circulating in the circulation path 210 as a product. Therefore, the product collection pipe 250 serves as a collection unit.

In the cooled anionic surfactant aqueous solution manufacturing method of the first embodiment using the neutralization device 200, the circulation pump 220 sends and circulates the anionic surfactant aqueous solution in the circulation path 210.

Here, the flow rate of the anionic surfactant aqueous solution circulating in the circulation path 210 is, for example, 0.01 to 100 ton/hr. The temperature of the anionic surfactant aqueous solution in the circulation path 210 is not particularly limited, and is preferably 0° C. or more, more preferably 20° C. or more, in order to reduce the viscosity and thereby increase the flowability. On the other hand, in order to reduce the decomposition, the temperature of the anionic surfactant aqueous solution in the circulation path 210 is preferably 150° C. or less, more preferably 100° C. or less.

The acid precursor of the anionic surfactant and the alkali are continuously supplied from the acid supply pipe 231 and the alkali supply pipe 232, respectively, to the material mixer 230. In the material mixer 230, these materials are mixed with the anionic surfactant aqueous solution circulating in the circulation path 210, and the resulting mixture is continuously supplied back to the circulation path 210.

Here, examples of the acid precursor of the anionic surfactant include: sulfuric acid esters such as alkyl sulfuric acid and polyoxyethylene alkyl ether sulfuric acid; sulfonic acids such as alkyl benzene sulfonic acid; carboxylic acids; phosphoric acid esters; etc. The acid precursor may be a single species or a mixture of two or more different species. When the acid precursor is a mixture of two or more different species, the two or more different species may be previously mixed together before being supplied to the material mixer 230, or alternatively, may be supplied to the material mixer 230 before being mixed together.

Examples of the alkali include: alkali metal carbonates and alkaline-earth metal carbonates such as sodium carbonate, potassium carbonate, and magnesium carbonate; alkali metal hydrogen carbonates such as sodium hydrogen carbonate and potassium hydrogen carbonate; alkali metal hydroxides and alkaline-earth metal hydroxides such as sodium hydroxide, potassium hydroxide, lithium hydroxide, magnesium hydroxide, and calcium hydroxide; ammonia; mono-, di-, and tri-alkanolamines; primary, secondary, and tertiary alkylamines; and the like. The alkali may be a single species or a mixture of two or more different species. When the alkali is a mixture of two or more different species, the two or more different species may be previously mixed together before being supplied to the material mixer 230, or alternatively, may be supplied to the material mixer 230 before being mixed together. The alkali may be supplied as an aqueous solution. In this case, the concentration is not particularly limited if the anionic surfactant exhibits flowability, and is, for example, 0.1 to 90 mass %.

The mixing ratio of the acid precursor and the alkali is preferably one molar equivalent or more of the alkali with respect to the acid precursor in order to complete the acid neutralization.

A component other than the acid precursor and the alkali may be supplied to the material mixer 230, and then supplied to the anionic surfactant aqueous solution circulating in the circulation path 210. Examples of this component include water for concentration adjustment, pH buffering agents, viscosity adjusting agents, etc. Examples of the pH buffering agent include sodium carbonate, phosphoric acid, citric acid, etc. Examples of the viscosity adjusting agent include: organic solvents such as ethanol, PEG, and PPG; inorganic salts such as sodium carbonate and sodium sulfate; and the like.

In the heat removal cooler 240, the cooling tank 241 is evacuated through the gas discharge pipe 243 so that the cooling tank 241 contains the atmosphere having the pressure which is lower than or equal to the saturated vapor pressure of water. When the anionic surfactant aqueous solution is sprayed from the spray nozzle 242 into the cooling tank 241, at least a portion of water contained in the anionic surfactant aqueous solution is vaporized, whereby the anionic surfactant aqueous solution is cooled. Also, dehumidified air is introduced from the gas introduction pipe 244 to contact the sprayed anionic surfactant aqueous solution, whereby the anionic surfactant aqueous solution is defoamed.

Here, the cooling is conducted under the conditions for the method for cooling liquid of the first embodiment, and a gas other than the volatile component is introduced into the atmosphere having the pressure to contact the liquid. The temperature and the density under atmospheric pressure of the liquid before being supplied to the cooling tank 241 are, for example, 0 to 220° C. and 0.1 to 2.0 kg/L, respectively. The temperature and the density under vacuum of the liquid after cooling are, for example, −20 to 200° C. and 0.3 to 2.0 kg/L, respectively.

A portion of the anionic surfactant aqueous solution circulating in the circulation path 210 is continuously extracted and collected as a product to the product collection pipe 250.

Here, the circulation ratio is preferably, but not particularly limited to, 30 times or less, more preferably 25 times or less, in order to reduce the load of the circulation pump 220, and reduce the amount of the anionic surfactant aqueous solution stored and retained in the device to reduce loss during changing products. On the other hand, in order to reduce an increase in temperature due to neutralization heat after the neutralization and thereby reduce the decomposition, the circulation ratio is preferably one time or more, more preferably two times or more. Note that the circulation ratio is defined as a value which is obtained by dividing the flow rate of the anionic surfactant aqueous solution circulating in the circulation path 210 by the flow rate of the anionic surfactant aqueous solution collected through the product collection pipe 250, at the connection portion of the product collection pipe 250. The concentration of the anionic surfactant in the collected anionic surfactant aqueous solution is, for example, 0.1 to 90 mass %, and the density under atmospheric pressure of the anionic surfactant aqueous solution is, for example, 0.3 to 2.0 kg/L.

According to the above cooled anionic surfactant aqueous solution manufacturing method of the first embodiment, the anionic surfactant aqueous solution is cooled by removal of heat under vacuum. Therefore, compared to when a heat exchanger is used for cooling, the device cost can be reduced, and the amount of the anionic surfactant aqueous solution stored and retained in the device can be reduced, whereby loss during changing products can be reduced. Also, defoaming is performed while the anionic surfactant aqueous solution is cooled, and therefore, an additional defoaming step is not required.

(Test Evaluation 1)
<Cooling of Liquid>

Examples 1-1 through 1-12 and Comparative Examples 1-1 through 1-3 described below were conducted. The details of the examples are shown in Tables 1 and 2.

EXAMPLE 1-1

In a cooling device having the configuration of FIG. 1 (the volume of the upper vessel is 120 L, the volume of the lower vessel is 420 L, and the inner diameter of the connecting pipe is 160 mm), a spray nozzle A available from Spraying Systems Co., Japan under the trade name "Spiral Jet B3/8HHSJ-SS6030" was attached to a tip of the liquid supply pipe. Thereafter, a sodium alkylsulfate aqueous solution available from Kao Corporation under the trade name "Emal 2FDH" (form: paste, concentration: 65 mass %, and density: 1.08 kg/L) (hereinafter referred to as "AS") having a temperature of 77.8° C. was supplied from the liquid supply pipe through the spray nozzle A to the upper vessel at a flow rate of 1 ton/hr. Also, dehumidified air having a temperature of 32.6° C. was introduced from the third gas introduction pipe into the connecting pipe at a flow rate of 0.3 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 11.4 min.

As a result, the density under vacuum and the temperature of the AS stored and retained in the lower vessel were 0.88 kg/L and 62.2° C., respectively. After breaking vacuum, the density under atmospheric pressure was 1.08 kg/L.

Note that the density under vacuum of the liquid was determined as follows. The mass of the liquid discharged through the liquid discharge pipe by the evacuation pump was measured, and the volume of the liquid was calculated based on the level or height of the liquid sticking to or left on the wall surface of the lower vessel after breaking vacuum (this level or height is hereinafter referred to as a "liquid surface level"). The mass is divided by the volume to calculate the density (the same applies to examples described below).

EXAMPLE 1-2

In a cooling device having the configuration of FIG. 1 (the volume of the upper vessel is 120 L, the volume of the lower vessel is 420 L, and the inner diameter of the connecting pipe is 160 mm), a spray nozzle B available from Spraying Systems Co., Japan under the trade name "Spiral Jet B3/4HHSJ-SS60210" was attached to a tip of the liquid supply pipe. Thereafter, a bubble-entrained fluid having a density of 0.71 kg/L made of an sodium polyoxyethylene alkyl ether sulfate aqueous solution available from Kao Corporation under the trade name "Emal 270J" (form: paste, and concentration: 70 mass %) (hereinafter referred to as "bubble-entrained AES") having a temperature of 77.2° C. was supplied from the liquid supply pipe through the spray nozzle B to the upper vessel at a flow rate of 1 ton/hr. Also, dehumidified air having a temperature of 21.6° C. was introduced from the third gas introduction pipe into the connecting pipe at a flow rate of 1.0 mass % with respect to the flow rate of the bubble-entrained AES, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 5.4 min.

As a result, the density under vacuum and the temperature of the AES stored and retained in the lower vessel were 1.05 kg/L and 60.8° C., respectively.

COMPARATIVE EXAMPLE 1-1

In a cooling device having the configuration of FIG. 1 (the volume of the upper vessel is 120 L, the volume of the lower vessel is 420 L, and the inner diameter of the connecting pipe is 160 mm), a spray nozzle C available from Spraying Systems Co., Japan under the trade name "Spiral Jet B3/8HHSJ-SS12030" was attached to a tip of the liquid supply pipe. Thereafter, AS having a temperature of 72.0° C. was supplied from the liquid supply pipe through the spray nozzle C to the upper vessel at a flow rate of 1 ton/hr. Gas introduction was not conducted. In this case, the atmosphere having the pressure was maintained at 20.0 kPa in the upper vessel, the connecting pipe, and the lower vessel. The running time was 23.3 min.

As a result, the density under vacuum and the temperature of the AS stored and retained in the lower vessel were 0.25 kg/L and 60.4° C., respectively.

COMPARATIVE EXAMPLE 1-2

The same cooling device as that used in Comparative Example 1-1 was prepared. Thereafter, a bubble-entrained fluid made of AS (hereinafter referred to as "bubble-entrained AS") having a temperature of 74.0° C. and a density of 0.61 kg/L was supplied from the liquid supply pipe through the spray nozzle C to the upper vessel at a flow rate of 1 ton/hr. Gas introduction was not conducted. In this case, the atmosphere having the pressure was maintained at 20.0 kPa in the upper vessel, the connecting pipe, and the lower vessel. The running time was 5.0 min.

As a result, the density under vacuum and the temperature of the AS stored and retained in the lower vessel were 0.06 kg/L and 60.9° C., respectively.

EXAMPLE 1-3

The same cooling device as that used in Example 1-1 was prepared. Thereafter, AS having a temperature of 75.3° C. was supplied from the liquid supply pipe through the spray nozzle A to the upper vessel at a flow rate of 3 ton/hr. Also, dehumidified air having a temperature of 20.3° C. was introduced from the third gas introduction pipe into the connecting pipe at a flow rate of 0.4 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 9.4 min.

As a result, the density under vacuum and the temperature of the AS stored and retained in the lower vessel were 0.82 kg/L and 58.9° C., respectively. After breaking vacuum, the density under atmospheric pressure was 1.08 kg/L.

EXAMPLE 1-4

The same cooling device as that used in Example 1-1 was prepared. Thereafter, AS having a temperature of 75.9° C. was supplied from the liquid supply pipe through the spray nozzle A to the upper vessel at a flow rate of 3 ton/hr. Also, dehumidified air having a temperature of 16.1° C. was introduced through the second gas introduction pipe into the lower vessel at a flow rate of 0.4 mass % with respect to the flow rate of the AS, and was discharged through the second gas discharge pipe of the lower vessel. In this case, the atmosphere having the pressure was maintained at 20.0 kPa in the upper vessel, the connecting pipe, and the lower vessel. The gas-liquid contact was conducted under the gas-liquid counter-current contact conditions 2. The running time was 10.9 min.

As a result, the density under vacuum and the temperature of the AS stored and retained in the lower vessel were 0.53 kg/L and 62.3° C., respectively.

EXAMPLE 1-5

The same cooling device as that used in Example 1-1 was prepared. Thereafter, AS having a temperature of 74.8° C. was supplied from the liquid supply pipe through the spray nozzle A to the upper vessel at a flow rate of 3 ton/hr. Also, dehumidified air having a temperature of 16.0° C. was introduced through the first gas introduction pipe into the upper vessel at a flow rate of 0.2 mass % with respect to the flow rate of the AS, and was discharged through the second gas discharge pipe of the lower vessel. In this case, the atmosphere having the pressure was maintained at 20.0 kPa in the upper vessel, the connecting pipe, and the lower vessel. The gas-liquid contact was conducted under the gas-liquid co-current contact conditions 1. The running time was 8.8 min.

As a result, the density under vacuum and the temperature of the AS stored and retained in the lower vessel were 0.44 kg/L and 61.6° C., respectively.

EXAMPLE 1-6

In a cooling device having the configuration of FIG. 1 (the volume of the upper vessel is 120 L, the volume of the lower vessel is 420 L, and the inner diameter of the connecting pipe is 160 mm), a single-pipe nozzle was attached to a tip of the liquid supply pipe. Thereafter, AS having a temperature of 75.8° C. was supplied from the liquid supply pipe through the single-pipe nozzle to the upper vessel at a flow rate of 3 ton/hr. Also, dehumidified air having a temperature of 23.1° C. was introduced from the third gas introduction pipe into the connecting pipe at a flow rate of 0.4 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 5.5 min.

As a result, the density under vacuum and the temperature of the AS stored and retained in the lower vessel were 0.60 kg/L and 64.9° C., respectively.

EXAMPLE 1-7

The same cooling device as that used in Example 1-2 was prepared. Thereafter, bubble-entrained AS having a temperature of 75.4° C. was supplied from the liquid supply pipe through the spray nozzle B to the upper vessel at a flow rate of 3 ton/hr. Also, dehumidified air having a temperature of 25.2° C. was introduced from the third gas introduction pipe into the connecting pipe at a flow rate of 0.3 mass % with respect to the flow rate of the bubble-entrained AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 7.4 min.

As a result, the density under vacuum and the temperature of the AS stored and retained in the lower vessel were 0.64 kg/L and 61.1° C., respectively. After breaking vacuum, the density under atmospheric pressure was 1.06 kg/L.

EXAMPLE 1-8

A polyoxyethylene alkyl ether available from Kao Corporation under trade name "Emulgen 106" and AS were mixed at a mass ratio of 54:46 to obtain a surfactant mixture solution (hereinafter referred to as "AS/AE"). The surfactant concentration of the mixture solution was 84%.

The same cooling device as that used in Example 1-1 was prepared. Thereafter, the AS/AE having a temperature of 80.6° C. was supplied from the liquid supply pipe through the spray nozzle A to the upper vessel at a flow rate of 3 ton/hr. Also, dehumidified air having a temperature of 21.8° C. was introduced from the third gas introduction pipe into the connecting pipe at a flow rate of 0.4 mass % with respect to the flow rate of the AS/AE, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 6.2 min.

In Example 1-8, when the AS/AE fell to the lower vessel, a large amount of the material scattered on the wall surface, and therefore, it was difficult to determine the liquid surface level. Therefore, the density under vacuum was not able to be calculated. However, the flow rate of the liquid discharged by the positive-displacement evacuation pump was higher than that of Example 1-3. Therefore, the density under vacuum is estimated to be higher than that of Example 1-3. The temperature of the AS/AE was 60.4° C.

EXAMPLE 1-9

The same cooling device as that used in Example 1-2 was prepared. Thereafter, AS having a temperature of 74.4° C. was supplied from the liquid supply pipe through the spray nozzle B to the upper vessel at a flow rate of 5 ton/hr. Also, dehumidified air having a temperature of 22.4° C. was introduced from the third gas introduction pipe into the connecting pipe at a flow rate of 0.5 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 5.2 min.

As a result, the density under vacuum and the temperature of the AS stored and retained in the lower vessel were 0.74 kg/L and 61.9° C., respectively.

EXAMPLE 1-10

The same cooling device as that used in Example 1-2 was prepared. Thereafter, AS having a temperature of 78.0° C. was supplied from the liquid supply pipe through the spray nozzle B to the upper vessel at a flow rate of 5 ton/hr. Also, dehumidified air having a temperature of 80.8° C. was introduced from the third gas introduction pipe into the connecting pipe at a flow rate of 0.5 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 4.9 min.

As a result, the density under vacuum and the temperature of the AS stored and retained in the lower vessel were 0.78 kg/L and 61.1° C., respectively.

EXAMPLE 1-11

The same cooling device as that used in Example 1-2 was prepared. Thereafter, AS having a temperature of 79.5° C. was supplied from the liquid supply pipe through the spray nozzle B to the upper vessel at a flow rate of 5 ton/hr. Also, the atmosphere having a temperature of 31.8° C. and a relative humidity of 43.7% was introduced from the third gas introduction pipe into the connecting pipe at a flow rate of 0.5 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3. The running time was 4.4 min.

As a result, the density under vacuum and the temperature of the AS stored and retained in the lower vessel were 0.59 kg/L and 62.4° C., respectively.

EXAMPLE 1-12

The same cooling device as that used in Example 1-2 was prepared. Thereafter, a sodium alkylsulfate aqueous solution available from Kao Corporation under the trade name "Emal 2F-HP" (form: low-viscosity liquid, concentration: 30 mass %, and density: 1.03 kg/L) (hereinafter referred to as "low-viscosity AS") having a temperature of 56.2° C. was supplied from the liquid supply pipe through the spray nozzle B to the upper vessel at a flow rate of 5 ton/hr. Also, dehumidified air having a temperature of 14.1° C. was introduced from the third gas introduction pipe into the connecting pipe at a flow rate of 0.4 mass % with respect to the flow rate of the low-viscosity AS, and was discharged through the first gas discharge pipe of the upper vessel. In this case, the atmosphere having the pressure was maintained at 10.2 kPa in the upper vessel, the connecting pipe, and the lower vessel. The gas-liquid contact was conducted under the gas-liquid counter-current contact conditions 3. The running time was 3.3 min.

As a result, the density under vacuum and the temperature of the AS stored and retained in the lower vessel were 0.75 kg/L and 40.0° C., respectively.

COMPARATIVE EXAMPLE 1-3

The same cooling device as that used in Example 1-2 was prepared. Thereafter,

AS having a temperature of 72.7° C. was supplied from the liquid supply pipe through the spray nozzle B to the upper vessel at a flow rate of 5 ton/hr. Also, steam having a temperature of 150° C. was introduced from the third gas introduction pipe into the connecting pipe at a flow rate of 0.2 mass % with respect to the flow rate of the AS, and was discharged through the first gas discharge pipe of the upper vessel. In this case, the atmosphere having the pressure was maintained at 20.0 kPa in the upper vessel, the connecting pipe, and the lower vessel. The gas-liquid contact was conducted under the gas-liquid counter-current contact conditions 3.

In Comparative Example 1-3, defoaming did not proceed, and the cooling device was filled with bubble-entrained AS. One minute after start of running, the bubble-entrained AS overflowed from the second gas discharge pipe, so that the device was not able to run. The temperature of the AS in the device was 71.4° C.

TABLE 1

| | Examples | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| (Spray) Nozzle | A | B | A | A | A | SPN | B | A | B | B | B | B |
| Pressure In Device kPa | 20.0 | 20.0 | 20.0 | 20.0 | 20.0 | 20.0 | 20.0 | 20.0 | 20.0 | 20.0 | 20.0 | 10.2 |
| Liquid | AS | BE-AES | AS | AS | AS | AS | BE-AS | AS/AE | AS | AS | AS | LC-AS |

TABLE 1-continued

| | Examples | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Temperature Of Liquid ° C. | 77.8 | 77.2 | 75.3 | 75.9 | 74.8 | 75.8 | 75.4 | 80.6 | 74.4 | 78.0 | 79.5 | 56.2 |
| Flow Rate Of Liquid ton/hr | 1 | 1 | 3 | 3 | 3 | 3 | 3 | 3 | 5 | 5 | 5 | 5 |
| Gas | DA | DA | DA | DA | DA | DA | DA | DA | DA | DA | TA | DA |
| Temperature Of Gas ° C. | 32.6 | 21.6 | 20.3 | 16.1 | 16.0 | 23.1 | 25.2 | 21.8 | 22.4 | 80.8 | 31.8 | 14.1 |
| Gas Flow Rate To Liquid Flow Rate mass % | 0.3 | 1.0 | 0.4 | 0.4 | 0.2 | 0.4 | 0.3 | 0.4 | 0.5 | 0.5 | 0.5 | 0.4 |
| Gas-Liquid Contact Conditions | CC3 | CC3 | CC3 | CC2 | SC1 | CC3 | CC3 | CC3 | CC3 | CC3 | CC3 | CC3 |
| Running Time Min | 11.4 | 5.4 | 9.4 | 10.9 | 8.8 | 5.5 | 7.4 | 6.2 | 5.2 | 4.9 | 4.4 | 3.3 |
| Density Under Vacuum After Cooling kg/L | 0.88 | 1.05 | 0.82 | 0.53 | 0.44 | 0.60 | 0.64 | High | 0.74 | 0.78 | 0.59 | 0.75 |
| Temperature After Cooling ° C. | 62.2 | 60.8 | 58.9 | 62.3 | 61.6 | 64.9 | 61.1 | 60.4 | 61.9 | 61.1 | 62.4 | 40.0 |
| Density Under Atmospheric Pressure After Cooling kg/L | 1.08 | — | 1.08 | — | — | — | 1.06 | — | — | — | — | — |

Note that:
SPN Single-Pipe Nozzle
BE-AES: Bubble-Entrained AES
BE-AS: Bubble-Entrained AS
LC-AS: Low-Concentration AS
DA: Dehumidified Air
TA: The Atmosphere
CC: Counter-Current Conditions
SC: Co-Current Conditions

TABLE 2

| | Comparative Examples | | |
|---|---|---|---|
| | 1-1 | 1-2 | 1-3 |
| (Spray) Nozzle | C | C | B |
| Pressure In Device kPa | 20.0 | 20.0 | 20.0 |
| Liquid | AS | Bubble-Entrained AS | AS |
| Temperature Of Liquid ° C. | 72.0 | 74.0 | 72.7 |
| Flow Rate Of Liquid ton/hr | 1 | 1 | 5 |
| Gas | Not Added | Not Added | Steam |
| Temperature Of Gas ° C. | — | — | 150 |
| Gas Flow Rate To Liquid Flow Rate mass % | — | — | 0.2 |
| Gas-Liquid Contact Conditions | — | — | Counter-Current Conditions 3 |
| Running Time Min | 23.3 | 5.0 | Not Able To Run After 1 min |
| Density Under Vacuum After Cooling kg/L | 0.25 | 0.06 | Low |
| Temperature After Cooling ° C. | 60.4 | 60.9 | 71.4 |
| Density Under Atmospheric Pressure After Cooling kg/L | — | — | — |

<Manufacture of Anionic Surfactant Aqueous Solution>

A sodium alkylsulfate (anionic surfactant) was manufactured by a neutralization device having the configuration of FIG. 2. A spray nozzle available from Spraying Systems Co., Japan under the trade name "Spiral Jet B1/2HHSJ-316L60120" was attached to the inside of the cooling tank. Alkyl sulfuric acid (an acid precursor of an anionic surfactant), 27.0 mass % sodium hydroxide aqueous solution (alkali), and 20.0 mass % sodium carbonate aqueous solution (buffering agent) were supplied to the material supply unit, where the amounts of these components were 0.63 parts by mass, 0.34 parts by mass, and 0.10 parts by mass, respectively, with respect to 1 part by mass of the sodium alkylsulfate aqueous solution to be collected through the product collection pipe. The atmosphere having the pressure in the cooling tank was maintained at 20.0 kPa by evacuation through the gas discharge pipe. Also, dehumidified air having a temperature of 20.0° C. was introduced into the cooling tank through the gas introduction pipe at a flow rate of 0.6 mass % with respect to the flow rate of the sodium alkylsulfate aqueous solution. Note that the distance between the spray outlet of the spray nozzle and the opening of the gas introduction pipe in the cooling tank was 1690 mm, and the sodium alkylsulfate aqueous solution and the dehumidified air contacted each other in a counter-current manner. The circulation ratio was 2.8 times.

In this manufacture of sodium alkylsulfate, the temperature and the density of the sodium alkylsulfate aqueous solution were 76.5° C. and 1.04 kg/L (under atmospheric pressure), respectively, upstream of the cooling tank. The temperature and the density of the sodium alkylsulfate aqueous solution were 61.8° C. and 0.77 kg/L (under vacuum), respectively, downstream of the cooling tank. The sodium alkylsulfate concentration and the density of the sodium alkylsulfate aqueous solution collected through the product collection pipe were 65.0 mass % and 1.04 kg/L (under atmospheric pressure), respectively.

Second Embodiment (Method for Cooling Liquid)

In a method for cooling liquid according to a second embodiment, a liquid containing a volatile component and a surfactant is supplied to a cooling zone of an atmosphere having a pressure which is lower than or equal to the saturated vapor pressure of the volatile component so that at least a portion of the volatile component is vaporized, whereby the liquid is cooled. A flying time which is defined as a value which is obtained by dividing the flying distance of the liquid by the initial speed of the liquid (represented by expression (I) below) is assumed to be 0.030 sec or more.

The liquid initial speed=the volume flow rate of the liquid during supply/the supply area of the liquid (I)

In general, when a liquid containing a volatile component and a surfactant is supplied to a cooling zone of an atmosphere having a pressure which is lower than or equal to the saturated vapor pressure of the volatile component so that at least a portion of the volatile component is vaporized, whereby the liquid is cooled, then if the liquid has foaming or viscous properties, bubbles are retained or entrained in the liquid to form foam like shaving cream or meringue, and therefore, the liquid after cooling has a lower density. In the cooling zone of the atmosphere having the pressure which is lower than or equal to the saturated vapor pressure of the volatile component, the temperature of the gas in the bubbles retained or entrained in the liquid is the boiling point. Therefore, if even a small pressure is applied, for example, by an evacuation pump, the bubbles condense, whereby the liquid can approach the true density. However, if the density of the liquid (the density of the liquid containing gas) is low, the cooling zone needs to have a large volume and also needs to have a height sufficient to prevent cavitation. Moreover, if the density of the liquid is low, the flowability of the liquid is low, and therefore, for example, a larger-size evacuation pump is required, leading to an increase in cost.

In this situation, in the method of blowing, onto the surface of a liquid, a gas having a lower temperature than the solution temperature (see PATENT DOCUMENT 1), it takes a time for bubbles to move upward to reach the liquid surface, and therefore, means for storing and retaining the liquid is required, and this method is not applicable to viscous liquids in which bubbles move upward at considerably low speed. In the method of, when blowing a liquid into an evaporator, evaporating the liquid in a pipe to produce a gas-liquid two-phase state (see PATENT DOCUMENT 2), it is necessary to heat the liquid before being supplied to the evaporator, and therefore, this method is not applicable to liquids having low thermal stability. Also, the flow state needs to be an intermittent flow or an annular flow, and therefore, the operating ranges of the pressure and the temperature are disadvantageously limited. In the method of supplying a liquid to a degassing device where the pressure has been reduced and cooling the liquid as the liquid flows down along the inner wall surface of the degassing device (see PATENT DOCUMENTS 3 and 4), the heat transfer coefficient of the liquid in which bubbles are retained or entrained is reduced, and therefore, it is considerably inefficient to cool the liquid in the inner wall surface as a heat transfer surface.

However, according to the method for cooling liquid of the second embodiment, when the liquid is cooled as described above, the flying time of the liquid is set to be 0.030 sec or more, whereby bubbles retained or entrained in the liquid can be removed without the above drawbacks and regardless of the use or nonuse of a defoamer. Therefore, it is possible to reduce or prevent contamination of the liquid after cooling with impurities. The flying time of the liquid is determined based on the size of the cooling zone. A longer flying time is more preferable. Specifically, the liquid flying time is 0.030 sec or more, preferably 0.035 sec or more, and more preferably 0.40 sec or more.

According to the method for cooling liquid of the second embodiment, ideally, all liquid that is supplied to the cooling zone of the atmosphere having the pressure which is lower than or equal to the saturated vapor pressure of the volatile component should have a flying time of 0.030 sec or more. However, even if a portion of the supplied liquid has a flying time of less than 0.030 sec, then when 30 volume % or more of all supplied liquid has a flying time of 0.030 sec or more, the effect of removing bubbles retained or entrained in the liquid can be sufficiently recognized. Sufficient care needs to be exercised in design of the cooling zone. Specifically, in order to effectively use the cooling zone, improve the productivity, etc., a plurality of supply nozzles may be provided, or the liquid may be supplied from a side surface when a vessel, etc. is used as the cooling zone, for example. In this case, the liquid droplets supplied from neighboring nozzles may collide with each other or the liquid may collide with the top plate portion, so that a portion of the supplied liquid may have a flying time of less than 0.030 sec. Therefore, when cooling is conducted, 30 volume % or more of all supplied liquid preferably has a flying time of 0.030 sec or more in order to remove bubbles retained or entrained in the liquid, more preferably 50 volume % or more, even more preferably 70 volume % or more, yet even more preferably 80 volume % or more, and still even more preferably 100 volume %.

The method for cooling liquid of the second embodiment may be carried out in a continuous, batch, or semibatch mode.

In the continuous mode, for example, an evacuation pump may be provided in a lower portion of a cooling device to which a liquid is supplied, and the liquid after cooling may be continuously discharged from the cooling device, whereby the liquid can be cooled. In this case, the resulting liquid can have a higher density, and therefore, a net positive suction head available (NPSHav) becomes larger for the evacuation pump, whereby cavitation can be reduced or prevented. Also, the surface of the liquid stored and retained in the device can be maintained at a lower height, whereby the height of the device can be reduced, and therefore, the cost can be reduced. Therefore, the method for cooling liquid of the second embodiment is particularly preferable to the continuous mode.

In the batch mode, a liquid having a higher density can be obtained, and therefore, the amount of the liquid processed per unit operation can be increased. Also, the volume of the device can be reduced, resulting in an economic benefit. Moreover, compared to a cooling method using a heat exchanger which is generally most frequently employed, pressure loss can be reduced. This pressure loss reduction becomes more significant as the viscosity of the liquid increases. Also, it is no longer necessary to increase the size of the flow path in order to reduce pressure loss, for example, and therefore, the volume of the device can be reduced, resulting in space savings.

Note that the method for cooling liquid of the second embodiment is effective not only in cooling, but also in condensation and removal of impurities because the volatile component is vaporized.

<Liquid>

Examples of the liquid include, but are not particularly limited to, viscous liquids and foaming liquids. The liquid also includes fluids (slurries) which contain solid particles and fluids (pastes) which have a high viscosity and may or may not contain solid particles. The liquid also includes fluids (bubble-entrained fluids) which contain or entrain bubbles such as air in the liquid.

The liquid includes at least a volatile component and a surfactant which imparts viscous or foaming properties to the liquid.

Examples of the volatile component include water, organic solvents, etc. Examples of the organic solvent include: alcohols such as methanol, ethanol, and isopropyl alcohol; ketones such as acetone and methyl ethyl ketone; esters such as methyl acetate and ethyl acetate; aliphatic hydrocarbons such as normal hexane; alicyclic hydrocarbons such as cyclohexane; aromatic hydrocarbons such as toluene and xylene; chlorimated aliphatic hydrocarbons such as dichloromethane and chloroform; and the like. The volatile component may be a single species or a mixture of two or more different species.

The surfactant may be a single species or a mixture of two or more different species. The content of the surfactant is, for example, 0.1 to 90 mass %. The defoaming effect is particularly significant for high-viscosity fluids and high-viscosity fluids (bubble-entrained fluids) containing or entraining bubbles such as air in the liquid. In this regard, the content of the surfactant is preferably 10 to 99 mass %, more preferably 30 to 95 mass %, even more preferably 50 to 90 mass %, and still even more preferably 55 to 85 mass %.

Examples of the surfactant include anionic surfactants, nonionic surfactants, cationic surfactants, amphoteric surfactants, amphiphilic polymers, etc.

Examples of the anionic surfactant include: sulfuric acid ester type such as alkyl sulfate and polyoxyethylene alkyl ether sulfate; sulfonic acid type such as alkyl benzene sulfonate; carboxylic acid type; phosphoric acid ester type; and the like. When these anionic surfactants are mixed with water, the viscosity of the resulting mixture increases and therefore the flowability decreases and eventually disappears with increasing concentration of the surfactant until a certain surfactant concentration. If the surfactant concentration further increases from the concentration, the mixture forms paste and the flowability reappears. This is commonly known.

Examples of the nonionic surfactant include: ether type such as polyoxyethylene alkyl ether; ester type such as glycerin fatty acid ester, sorbitan fatty acid ester, and sucrose fatty acid ester; ester-ether type such as polyoxyethylene sorbitan fatty acid ester; alkanolamide type such as alkyl alkanolamide; and the like.

Examples of the cationic surfactant include quaternary ammonium salt type, alkyl amine salt, etc.

Examples of the amphoteric surfactant include: carboxybetaine type such as alkyl betaine; amine oxide type such as alkyl amine oxide; and the like.

The amphiphilic polymer is a polymer having both hydrophobic and hydrophilic groups. For example, the amphiphilic polymer may be synthesized by copolymerization of a reactive surfactant and a hydrophilic monomer or copolymerization of an ionic hydrophilic monomer and a hydrophobic monomer. Note that the reactive surfactant is a surfactant having a polymerizable unsaturated double bond, or an ionic hydrophilic group and a hydrophobic group, in the molecule.

The liquid may further contain components for respective applications, etc.

The viscosity of the liquid is, for example, 0.01 to 1000 Pa·s. The viscosity of the liquid may be measured by a double coaxial cylinder viscometer.

Specific examples of the liquid include surfactant aqueous solutions, slurries containing a detergent composition, thickener aqueous solutions, liquids containing foods (sugars, chocolate, processed soybean milk, etc.), and the like.

The liquid before cooling may contain or entrain bubbles. When the bubble-entrained liquid is supplied to the cooling zone of the atmosphere having the pressure which is lower than or equal to the saturated vapor pressure of the volatile component, gas in the bubbles is expanded and is also pushed out and removed by the vaporized volatile component. Therefore, by using the bubble-entrained liquid, a liquid having a higher density than before cooling, and excellent flowability, can be obtained.

<Pressure and Temperature>

The pressure of the cooling zone to which the liquid is supplied is set to be lower than or equal to the saturated vapor pressure of the volatile component at the temperature of the cooling zone. In this case, typically, the cooling zone is desirably formed of the atmosphere having the pressure equal to the saturated vapor pressure of the volatile component at the temperature. If the volatile component is not cooled to a desired temperature due to boiling-point elevation, the atmosphere having the pressure is preferably set to have the pressure which is lower than the saturated vapor pressure. Note that the saturated vapor pressure of water at 25° C. is 3.17 kPa.

The temperature of the cooling zone is, for example, −20 to 200° C., but depending on the composition of the liquid supplied to the cooling zone.

<Operation of Supplying Liquid>

The temperature of the cooling zone is, for example, 0 to 220° C., but depending on the composition of the liquid supplied to the cooling zone. The liquid does not necessarily need to be previously heated, etc. Therefore, the method for cooling liquid of the second embodiment may be satisfactorily applicable to materials having poor thermal stability.

Means for supplying the liquid to the cooling zone is not particularly limited. Atomization means such as a spray nozzle is preferably used.

When the atomization means is used to supply the liquid to the cooling zone, the direction in which the liquid is supplied is preferably, but not particularly limited to, a downward direction (from top to bottom). The droplet diameter of the liquid is preferably 1 to 10000 μm. If it is difficult to spray the liquid in the form of droplets due to high viscosity, the liquid may be supplied in the form of film or bar. In this case, the thickness of the liquid film is preferably 1 to 10000 μm.

The liquid may be supplied to the cooling zone from a single point or a plurality of points. In particular, when the liquid has a high viscosity and therefore would cause large pressure loss, the liquid is preferably supplied from a plurality of points.

<Cooling Device>

Figure 3:
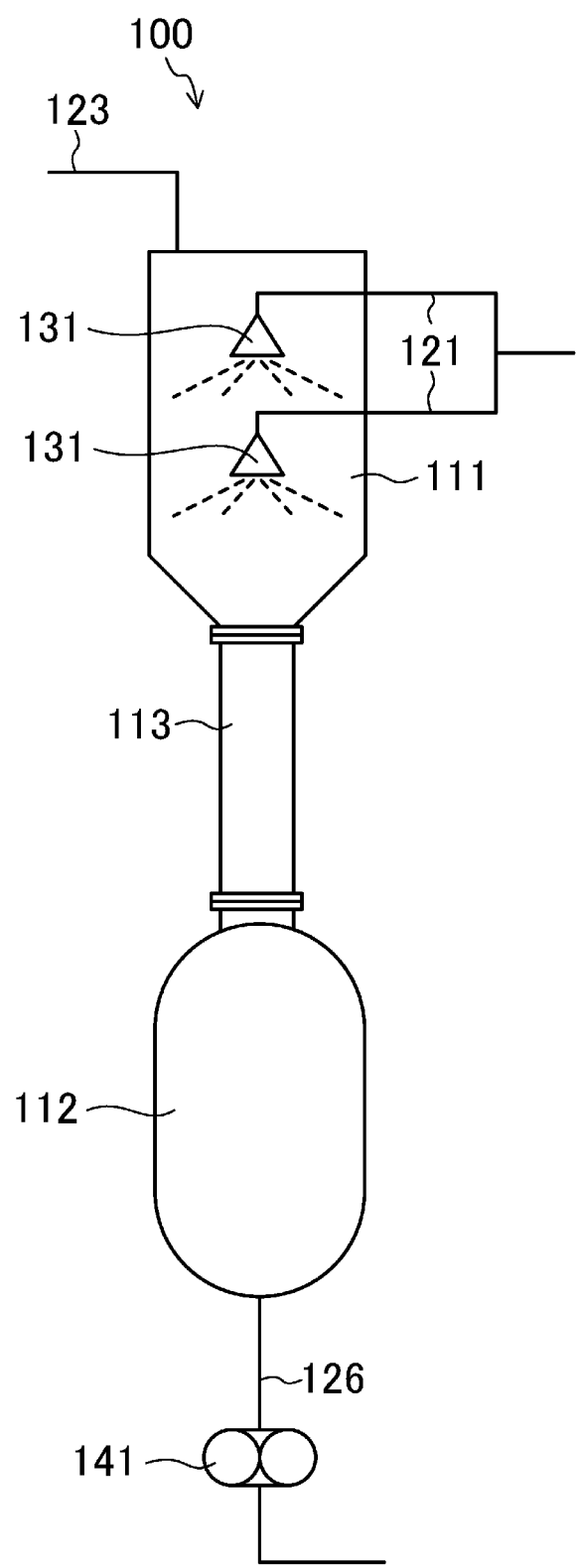
FIG. 3 is a diagram showing a configuration of a cooling device according to a second embodiment.

FIG. 3 shows an example cooling device 100 which can be used in the method for cooling liquid of the second embodiment. Note that parts having the same names as those of the first embodiment are indicated by the same reference characters as those of the first embodiment.

In the cooling device 100, an upper vessel (cooling tank) 111 and a lower vessel 112 are vertically arranged, and a lower portion of the upper vessel 111 and an upper portion of the lower vessel 112 are connected together by a connecting pipe 113 extending vertically.

A liquid supply pipe 121 is connected to, and penetrates into, an upper portion of the upper vessel 111. The liquid supply pipe 121 may be provided at other positions of the upper vessel 111. In order to increase the flying time of the supplied liquid to accelerate defoaming, the liquid supply pipe 121 is preferably provided at the upper portion of the upper vessel 111. There may be a plurality of the liquid supply pipes 121 (two at each of the upper and lower portions in FIG. 3). A gas discharge pipe 123 is connected to a top plate portion at the upper portion of the upper vessel 111. The volume of the upper vessel 111 is, for example, 1 to 10000 L.

A spray nozzle (liquid supply unit) 131 is attached to a tip of the liquid supply pipe 121. A method of supplying the liquid to the upper vessel 111 is not particularly limited. In order to increase the gas-liquid interface area to improve cooling efficiency, it is preferable to use atomization means, such as the spray nozzle 131, as described above. As the atomization means, the spray nozzle 131 is preferable because power is not required for atomization (i.e., power savings) and the maintenance is easy. The spray nozzle 131 is commercially available from, for example, Spraying Systems Co., Japan under the trade names "Spiral Jet Spray Nozzle" and "Full Jet Spray Nozzle" and from H. IKEUCHI Co. LTD. under the trade names "Hollow Cone Nozzle (AAP series)" and "Full Cone Nozzle (AJP series)." Examples of other atomization means include: those which perform atomization by pressure energy, such as spray valves; those which perform atomization by gas energy, such as two-fluid nozzles; those which perform atomization by centrifugal force, such as rotary spray pores and rotary disks; those which perform atomization by vibration energy such as nozzle vibration, ultrasonic wave; and the like. The spray nozzle 131 may be of full cone type or hollow cone type. The liquid supply area is, for example, 0.1 to 50000 mm$^2$.

A liquid discharge pipe 126 is connected to a lower portion (bottom portion) of the lower vessel 112 via the evacuation pump 141. The volume of the lower vessel 112 is, for example, 1 to 10000 L.

Here, when the liquid is cooled in the continuous mode, the NPSHav is preferably set to be larger than the net positive suction head required (NPSHre) of the evacuation pump 141, thereby reducing or preventing cavitation, and the length of the liquid discharge pipe 126 between the lower vessel 112 and the evacuation pump 141 is preferably set to be sufficient so that the discharge flow rate can be controlled to maintain the surface of the cooled liquid in the liquid discharge pipe 126 or in the lower vessel 112. In this case, as a detector for detecting the surface of the liquid, for example, a differential pressure level meter, an ultrasonic level meter, a radar level meter, etc. may be used. When the liquid is cooled in the batch or semibatch mode, the liquid discharge pipe 126 does not necessarily need to be connected to the lower portion (bottom portion) of the lower vessel 112.

The connecting pipe 113 has, for example, a length of 50 to 10000 mm and an inner diameter of 10 to 1000 mm.

Note that the cooling device 100 may be provided with thermal insulating means for keeping the heat of the liquid in the device, such as a hot-water jacket and an electric trace.

In the method for cooling liquid of the second embodiment using the cooling device 100, the liquid is supplied from the liquid supply pipe 121 through the spray nozzle 131 to the upper vessel 111. The liquid supplied to the upper vessel 111 is cooled to a temperature which provides the saturated vapor pressure of the volatile component (i.e., the boiling point under the pressure) in the upper vessel 111 which is evacuated through the gas discharge pipe 123 to provide a cooling zone of the atmosphere having the pressure which is lower than or equal to the saturated vapor pressure of the volatile component. Also, in the method for cooling liquid of the second embodiment, the flying time of the liquid supplied to the upper vessel 111 which is the cooling zone of the atmosphere having the pressure which is lower than or equal to the saturated vapor pressure of the volatile component is defined as the value which is obtained by dividing the flying distance of the liquid by the initial speed of the liquid represented by expression (I) below. The flying time of the liquid is assumed to be 0.030 sec or more.

$$\text{The liquid initial speed} = \text{the volume flow rate of the liquid during supply/the supply area of the liquid} \quad \text{(I)}$$

Here, the flying distance of the liquid whose flying time is 0.030 sec or more may include a distance (I) over which the liquid flies during a period of time from when the liquid is supplied from the spray nozzle 131 to when the liquid contacts the inner wall of the upper vessel 111, in the upper vessel 111 which provides the cooling zone of the atmosphere having the pressure.

Figure 4:
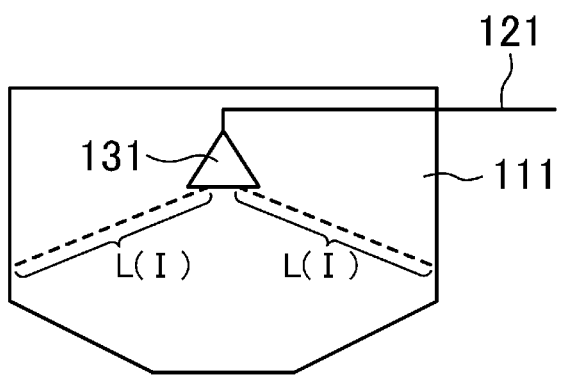
FIG. 4($a$) is a diagram for describing a flying distance (I), FIG. 4($b$) is a diagram for describing a flying distance (II), and FIG. 4($c$) is a diagram for describing a flying distance (III).
Figure 4:
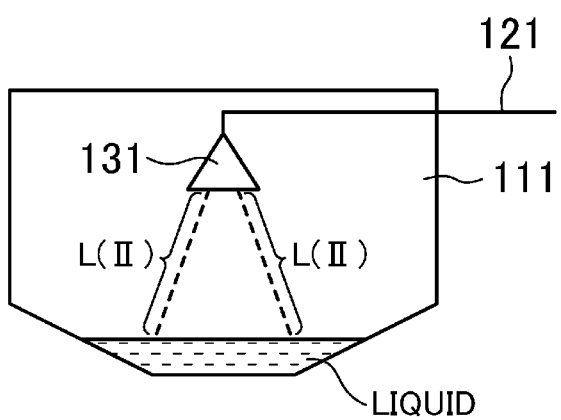
Figure 4:
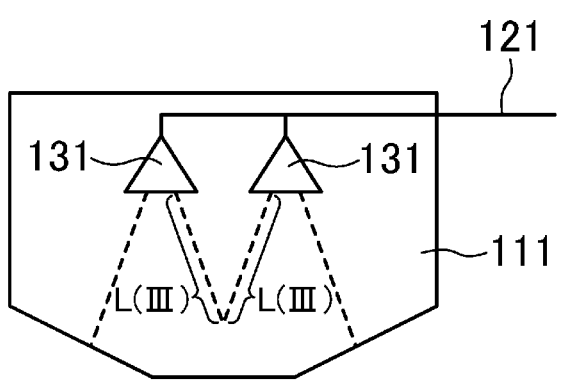

As shown in FIG. 4(*a*), for example, when the liquid is sprayed from the spray nozzle 131 whose spray outlet faces downward, diagonally downward in the shape of a hollow cone, the flying distance (I) is a linear distance L (I) between the spray outlet of the spray nozzle 131 which sprays the liquid and the inner wall of the upper vessel 111 which the liquid contacts.

The flying distance of the liquid whose flying time is 0.030 sec or more may also include a distance (II) over which the liquid flies during a period of time from when the liquid is supplied from the spray nozzle 131 to when the liquid contacts the liquid after cooling stored and retained in the upper vessel 111.

As shown in FIG. 4(*b*), for example, when the liquid is sprayed from the spray nozzle 131 whose spray outlet faces downward, diagonally downward in the shape of a hollow cone, the flying distance (II) is a linear distance L (II) between the spray outlet of the spray nozzle 131 which sprays the liquid and the surface of the liquid after cooling stored and retained in the upper vessel 111.

The flying distance of the liquid whose flying time is 0.030 sec or more may also include a distance (III) over which the liquid flies during a period of time from when the liquid is supplied from the spray nozzle 131 to when a liquid stream contacts another liquid stream flying in the upper vessel 111.

As shown in FIG. 4(*c*), for example, when the liquid is sprayed from a plurality of spray nozzles 131 whose spray outlets face downward, diagonally downward in the shape of a hollow cone, the flying distance (III) is a linear distance L (III) between the spray outlet of the spray nozzle 131 which sprays the liquid and the collision point of the liquid streams in the upper vessel 111.

All liquid (i.e., 100 volume %) supplied to the upper vessel 111 may have the same flying distance or a distribution of flying distances (i.e., various flying distances). In the method for cooling liquid of the second embodiment, at least 30 volume % or more of the liquid supplied to the upper vessel 111 has a flying time of 0.030 sec or more.

Note that a cooling device which can be used in the method for cooling liquid of the second embodiment is not limited to that shown in FIG. 3. Any device that includes at least a vessel (cooling tank), and a liquid supply unit and a gas discharge unit each of which is connected to the vessel, may be used.

(Method for Manufacturing Cooled Anionic Surfactant Aqueous Solution)

In a method for manufacturing a cooled anionic surfactant aqueous solution according to the second embodiment, an anionic surfactant aqueous solution which is obtained by neutralization of an acid precursor of an anionic surfactant with an alkali, is cooled in the method for cooling liquid of the second embodiment, where the volatile component is water and the surfactant is the anionic surfactant.

As the cooled anionic surfactant aqueous solution manufacturing method of the second embodiment, a method of circulating the anionic surfactant aqueous solution to manufacture the anionic surfactant in a continuous mode will be described hereinafter. Note that the cooled anionic surfactant aqueous solution manufacturing method of the second embodiment is not limited to this. The method may be carried out in a batch or semibatch mode.

Figure 5:
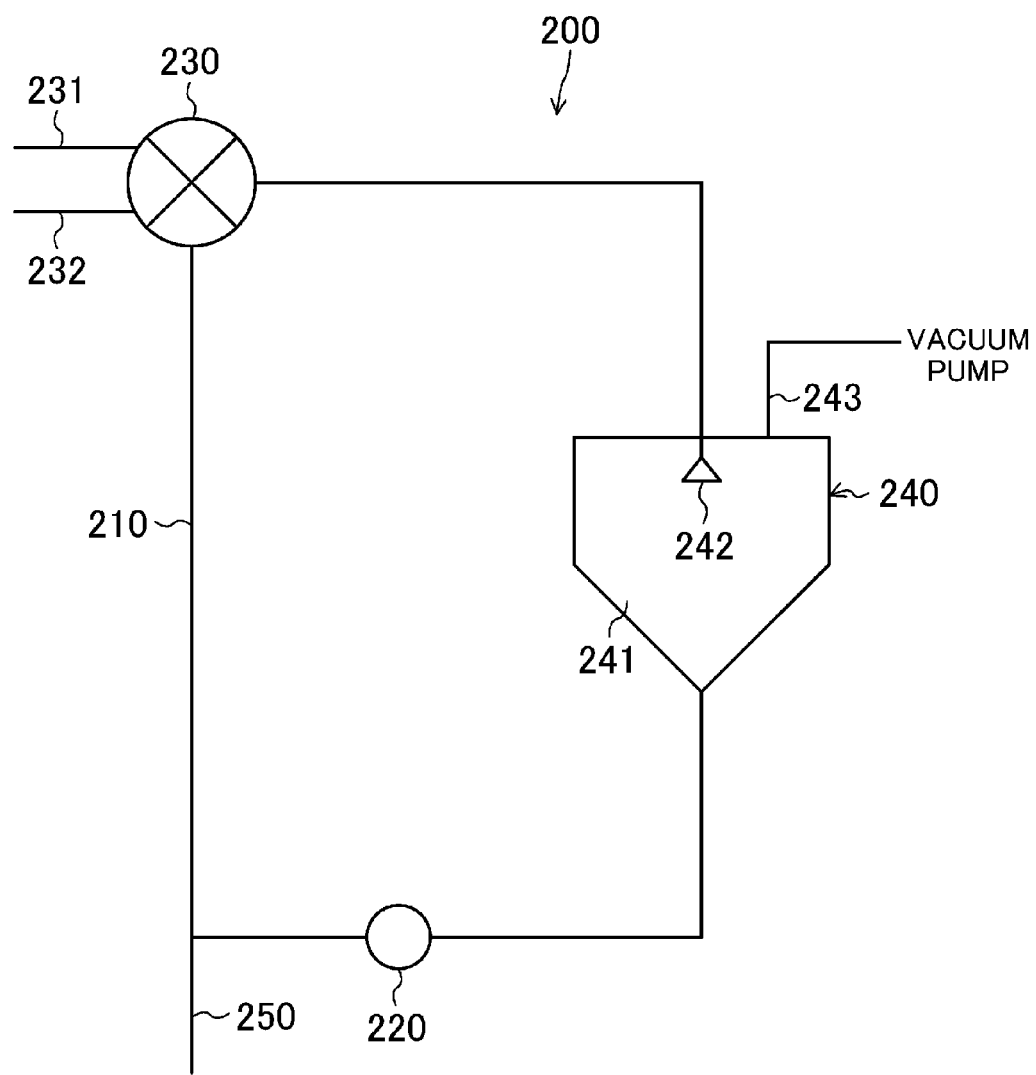
FIG. 5 is a diagram showing a configuration of a neutralization device according to the second embodiment.

FIG. 5 shows an example neutralization device 200 which can be used in the manufacture of the anionic surfactant aqueous solution of the second embodiment. Note that parts having the same names as those of the first embodiment are indicated by the same reference characters as those of the first embodiment.

The neutralization device 200 includes a circulation path 210 and a circulation pump 220 which is provided and inserted in the circulation path 210. The circulation path 210 is filled with the anionic surfactant aqueous solution, and the circulation pump 220 sends and circulates the anionic surfactant aqueous solution in the circulation path 210.

A material mixer 230 is provided and inserted in the circulation path 210 downstream of the circulation pump 220. An acid supply pipe 231 which is used to supply the acid precursor of the anionic surfactant (raw material) and an alkali supply pipe 232 which is used to supply the alkali are connected to the material mixer 230. The material mixer 230 is not particularly limited if it is of continuous type, and may be of drive type or static type. Of these types, the drive type is more preferable in order to reduce pressure loss and sufficiently mix. The material mixer 230 is used to mix the acid precursor of the anionic surfactant from the acid supply pipe 231 and the alkali from the alkali supply pipe 232 together with the anionic surfactant aqueous solution circulating in the circulation path 210 for the purpose of neutralization, and thereafter, continuously supply the resulting mixture back to the circulation path 210. Therefore, the material mixer 230, the acid supply pipe 231, and the alkali supply pipe 232 constitute a material supply unit.

A heat removal cooler 240 is provided and inserted in the circulation path 210 downstream of the material mixer 230 and upstream of the circulation pump 220. Elevation from the heat removal cooler 240 to the circulation pump 220 is designed so that the NPSHav is greater than or equal to the NPSHre of the circulation pump 220. The heat removal cooler 240 includes a cooling tank 241 to which the circulation path 210 is connected at an upper portion and a lower portion thereof. A spray nozzle 242 is provided in an upper portion of the cooling tank 241. The spray nozzle 242 is attached to a tip of a pipe which is extended from the circulation path 210 connected to a tank upper portion of the cooling tank 241. A gas discharge pipe 243 extended from a vacuum pump (not shown) is connected to a tank upper portion (top plate) of the cooling tank 241. The heat removal cooler 240 sprays the anionic surfactant aqueous solution from the spray nozzle 242 into the cooling tank 241 which has been evacuated through the gas discharge pipe 243 to provide the atmosphere having the pressure which is lower than or equal to the saturated vapor pressure of water, whereby at least a portion of water contained in the anionic surfactant aqueous solution is vaporized to cool the anionic surfactant aqueous solution. Therefore, the heat removal cooler 240 serves as a cooling unit.

A product collection pipe 250 is connected to the circulation path 210 downstream of the heat removal cooler 240 and the circulation pump 220 and upstream of the material mixer 230. The product collection pipe 250 is used to continuously collect a portion of the anionic surfactant aqueous solution circulating in the circulation path 210 as a product. Therefore, the product collection pipe 250 serves as a collection unit.

In the cooled anionic surfactant aqueous solution manufacturing method of the second embodiment using the neutralization device 200, the circulation pump 220 sends and circulates the anionic surfactant aqueous solution in the circulation path 210.

Here, the flow rate of the anionic surfactant aqueous solution circulating in the circulation path 210 is, for example, 0.01 to 100 ton/hr (volume flow rate: 0.000003 to 0.03 m$^3$/s). The temperature of the anionic surfactant aqueous solution in the circulation path 210 is not particularly limited, and is preferably 0° C. or more, more preferably 20° C. or more, in order to reduce the viscosity and thereby increase the flowability. On the other hand, in order to reduce the decomposition, the temperature of the anionic surfactant aqueous solution in the circulation path 210 is preferably 150° C. or less, more preferably 100° C. or less.

The acid precursor of the anionic surfactant and the alkali are continuously supplied from the acid supply pipe 231 and the alkali supply pipe 232, respectively, to the material mixer 230. In the material mixer 230, these materials are mixed with the anionic surfactant aqueous solution circulating in the circulation path 210, and the resulting mixture is continuously supplied back to the circulation path 210.

Here, examples of the acid precursor of the anionic surfactant include: sulfuric acid esters such as alkyl sulfuric acid and polyoxyethylene alkyl ether sulfuric acid; sulfonic acids such as alkyl benzene sulfonic acid; carboxylic acids; phosphoric acid esters; etc. The acid precursor may be a single species or a mixture of two or more different species. When the acid precursor is a mixture of two or more different species, the two or more different species may be previously mixed together before being supplied to the material mixer 230, or alternatively, may be supplied to the material mixer 230 before being mixed together.

Examples of the alkali include: alkali metal carbonates and alkaline-earth metal carbonates such as sodium carbonate, potassium carbonate, and magnesium carbonate; alkali metal hydrogen carbonates such as sodium hydrogen carbonate and potassium hydrogen carbonate; alkali metal hydroxides and alkaline-earth metal hydroxides such as sodium hydroxide, potassium hydroxide, lithium hydroxide, magnesium hydroxide, and calcium hydroxide; ammonia; mono-, di-, and tri-alkanolamines; primary, secondary, and tertiary alkylamines; and the like. The alkali may be a single species or a mixture of two or more different species. When the alkali is a mixture of two or more different species, the two or more different species may be previously mixed together before being supplied to the material mixer 230, or alternatively, may be separately supplied to the material mixer 230 and then mixed in the material mixer 230. The alkali may be supplied as an aqueous solution. In this case, the concentration is not particularly limited if the anionic surfactant exhibits flowability, and is, for example, 0.1 to 90 mass %.

The mixing ratio of the acid precursor and the alkali is preferably one molar equivalent or more of the alkali with respect to the acid precursor in order to complete the acid neutralization.

A component other than the acid precursor and the alkali may be supplied to the material mixer 230, and then supplied to the anionic surfactant aqueous solution circulating in the circulation path 210. Examples of this component include water for concentration adjustment, pH buffering agents, viscosity adjusting agents, etc. Examples of the pH buffering agent include sodium carbonate, phosphoric acid, citric acid, etc. Examples of the viscosity adjusting agent include: organic solvents such as ethanol, PEG, and PPG; inorganic salts such as sodium carbonate and sodium sulfate; and the like.

In the heat removal cooler 240, the cooling tank 241 is evacuated through the gas discharge pipe 243 so that the cooling tank 241 contains the atmosphere having the pressure which is lower than or equal to the saturated vapor pressure of water. When the anionic surfactant aqueous solution is sprayed from the spray nozzle 242 into the cooling tank 241, at least a portion of water contained in the anionic surfactant aqueous solution is vaporized, whereby the anionic surfactant aqueous solution is cooled.

Here, the cooling is conducted under the conditions for the method for cooling liquid of the second embodiment. For 50 volume % or more of the liquid, the flying time is 0.030 sec or more. The temperature and the density under atmospheric pressure of the liquid before being supplied to the cooling tank 241 are, for example, 0 to 220° C. and 0.1 to 2.0 kg/L, respectively. The temperature and the density under vacuum of the liquid after cooling are, for example, −20 to 200° C. and 0.3 to 2.0 kg/L, respectively.

A portion of the anionic surfactant aqueous solution circulating in the circulation path 210 is continuously extracted and collected as a product to the product collection pipe 250.

Here, the circulation ratio is preferably, but not particularly limited to, 30 times or less, more preferably 25 times or less, in order to reduce the load of the circulation pump 220, and reduce the amount of the anionic surfactant aqueous solution stored and retained in the device to reduce loss during changing products. On the other hand, in order to reduce an increase in temperature due to neutralization heat after the neutralization and thereby reduce the decomposition, the circulation ratio is preferably one time or more, more preferably two times or more. Note that the circulation ratio is defined as a value which is obtained by dividing the flow rate of the anionic surfactant aqueous solution circulating in the circulation path 210 by the flow rate of the anionic surfactant aqueous solution collected through the product collection pipe 250, at the connection portion of the product collection pipe 250. The concentration of the anionic surfactant in the collected anionic surfactant aqueous solution is, for example, 0.1 to 90 mass %, and the density under atmospheric pressure of the anionic surfactant aqueous solution is, for example, 0.3 to 2.0 kg/L.

According to the above cooled anionic surfactant aqueous solution manufacturing method of the second embodiment, the anionic surfactant aqueous solution is cooled by removal of heat under vacuum. Therefore, compared to when a heat exchanger is used for cooling, the device cost can be reduced, and the amount of the anionic surfactant aqueous solution stored and retained in the device can be reduced, whereby loss during changing products can be reduced. Also, defoaming is performed while the anionic surfactant aqueous solution is cooled, and therefore, an additional defoaming step is not required.

(Test Evaluation 2)
<Cooling of Liquid>

Examples 2-1 through 2-6 and Comparative Examples 2-1 through 2-3 described below were conducted. The details of the examples are shown in Tables 3 and 4.

EXAMPLE 2-1

In a cooling device having the configuration of FIG. 3 (the inner diameter of the upper vessel is 475 mm, the volume of the upper vessel is 270 L, the volume of the lower vessel is 420 L, and the inner diameter of the connecting pipe is 160 mm), a spray nozzle C available from Spraying Systems Co., Japan under the trade name "Spiral Jet B3/8HHSJ-SS12030" was attached to a tip of each of the two liquid supply pipes. Thereafter, a sodium alkylsulfate aqueous solution available from Kao Corporation under the trade name "Emal 2FDH" (form: paste, concentration: 65 mass %, and density: 1.08 kg/L) (hereinafter referred to as "AS") having a temperature of 75.7° C. was supplied from the liquid supply pipes through the spray nozzles C to the upper vessel at a flow rate of 2.7 ton/hr (the volume flow rate of the liquid per nozzle was 0.00035 $m^3/s$). Also, the cooling device was evacuated through the gas discharge pipe of the upper vessel. The atmosphere having the pressure was maintained at 20.0 kPa in the upper vessel, the connecting pipe, and the lower vessel. The running time was 5.4 min.

As a result, the density under vacuum and the temperature of the AS stored and retained in the lower vessel were 0.81 kg/L and 59.7° C., respectively. After breaking vacuum, the density under atmospheric pressure was 1.08 kg/L.

Figure 6:
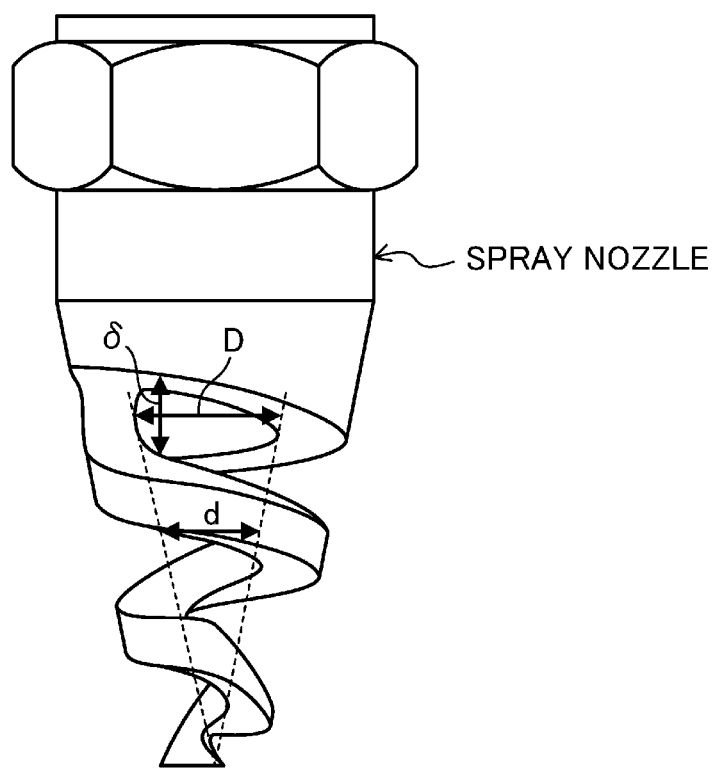
FIG. 6 is a side view of a spray nozzle.

Here, the spray angle of the spray nozzle was 120° and the inner diameter of the upper vessel was 475 mm, and therefore, the flying distance of 100 volume % of the AS was calculated as 0.274 m. The spray speed (initial speed) of the AS was calculated as 5.0 m/s. By dividing the flying distance by the spray speed, the flying time was calculated as 0.055 sec. The spray speed of the AS was calculated by dividing the volume flow rate of the AS by the supply area of the AS. As shown in FIG. 6, the spray nozzle C has a tip portion which is formed in the shape of a spiral extending downward while reducing the diameter. The liquid is sprayed through the spacing between each spiral turn. Because the AS is sprayed in the shape of a hollow cone, the supply area of the AS is defined as the opening area of the spacing of a turn at the base end. Note that the outer diameter D of the opening area of the spray nozzle C at the start point (base end) was 5.5 mm, the outer diameter d at the end point was 4.7 mm, and the width δ is 4.4 mm, and the area was calculated as 0.000070 $m^2$.

Note that the density under vacuum of the liquid was determined as follows. The mass of the liquid discharged through the liquid discharge pipe by the evacuation pump was measured, and the volume of the liquid was calculated based on the level or height of the liquid sticking to or left on the wall surface of the lower vessel after breaking vacuum. The mass is divided by the volume to calculate the density.

EXAMPLE 2-2

In a cooling device having the configuration of FIG. 3 (the inner diameter of the upper vessel is 800 mm, the volume of the upper vessel is 360 L, the volume of the lower vessel is 420 L, and the inner diameter of the connecting pipe is 160 mm), a spray nozzle A available from Spraying Systems Co., Japan under the trade name "Spiral Jet B3/8HHSJ-SS6030" was attached to a tip of the upper one of the two liquid supply pipes. Thereafter, AS having a temperature of 77.8° C. was supplied from the liquid supply pipes through the spray nozzle A to the upper vessel at a flow rate of 1.0 ton/hr (the volume flow rate of the liquid per nozzle was 0.00026 m$^3$/s). Also, the cooling device was evacuated through the gas discharge pipe of the upper vessel. The atmosphere having the pressure was maintained at 20.0 kPa in the upper vessel, the connecting pipe, and the lower vessel. The running time was 12.4 min.

As a result, the density under vacuum and the temperature of the AS stored and retained in the lower vessel were 0.88 kg/L and 62.2° C., respectively.

Here, the spray angle of the spray nozzle was 60° and the inner diameter of the upper vessel was 800 mm, and therefore, the flying distance of 100 volume % of the AS was calculated as 0.800 m. The spray speed (initial speed) of the AS was calculated as 3.9 m/s. By dividing the flying distance by the spray speed, the flying time was calculated as 0.205 sec. The spray speed and the supply area of the AS were calculated in the same manner as that of Example 2-1. Note that the outer diameter D of the opening area of the spray nozzle A at the start point (base end) was 5.1 mm, the outer diameter d at the end point was 4.3 mm, and the width δ is 4.5 mm, and the area was calculated as 0.000066 m$^2$.

EXAMPLE 2-3

In a cooling device having the configuration of FIG. 3 (the inner diameter of the upper vessel is 800 mm, the volume of the upper vessel is 360 L, the volume of the lower vessel is 420 L, and the inner diameter of the connecting pipe is 160 mm), a spray nozzle B available from Spraying Systems Co., Japan under the trade name "Spiral Jet B3/4HHSJ-SS60210" was attached to a tip of the upper one of the two liquid supply pipes. Thereafter, AS having a temperature of 80.2° C. was supplied from the liquid supply pipes through the spray nozzle B to the upper vessel at a flow rate of 5.3 ton/hr (the volume flow rate of the liquid per nozzle was 0.00135 m$^3$/s). Also, the cooling device was evacuated through the gas discharge pipe of the upper vessel. The atmosphere having the pressure was maintained at 20.0 kPa in the upper vessel, the connecting pipe, and the lower vessel. The running time was 3.8 min.

As a result, the density under vacuum and the temperature of the AS stored and retained in the lower vessel were 0.84 kg/L and 62.8° C., respectively.

Here, as in Example 2-2, the flying distance of 100 volume % of the AS was calculated as 0.800 m. The spray speed (initial speed) of the AS was calculated as 5.7 m/s. By dividing the flying distance by the spray speed, the flying time was calculated as 0.140 sec. The spray speed and the supply area of the AS were calculated in the same manner as that of Example 2-1. Note that the outer diameter D of the opening area of the spray nozzle B at the start point (base end) was 14 mm, the outer diameter d at the end point was 9 mm, and the width δ is 6.6 mm, and the area was calculated as 0.000238 m$^2$.

EXAMPLE 2-4

Figure 7:
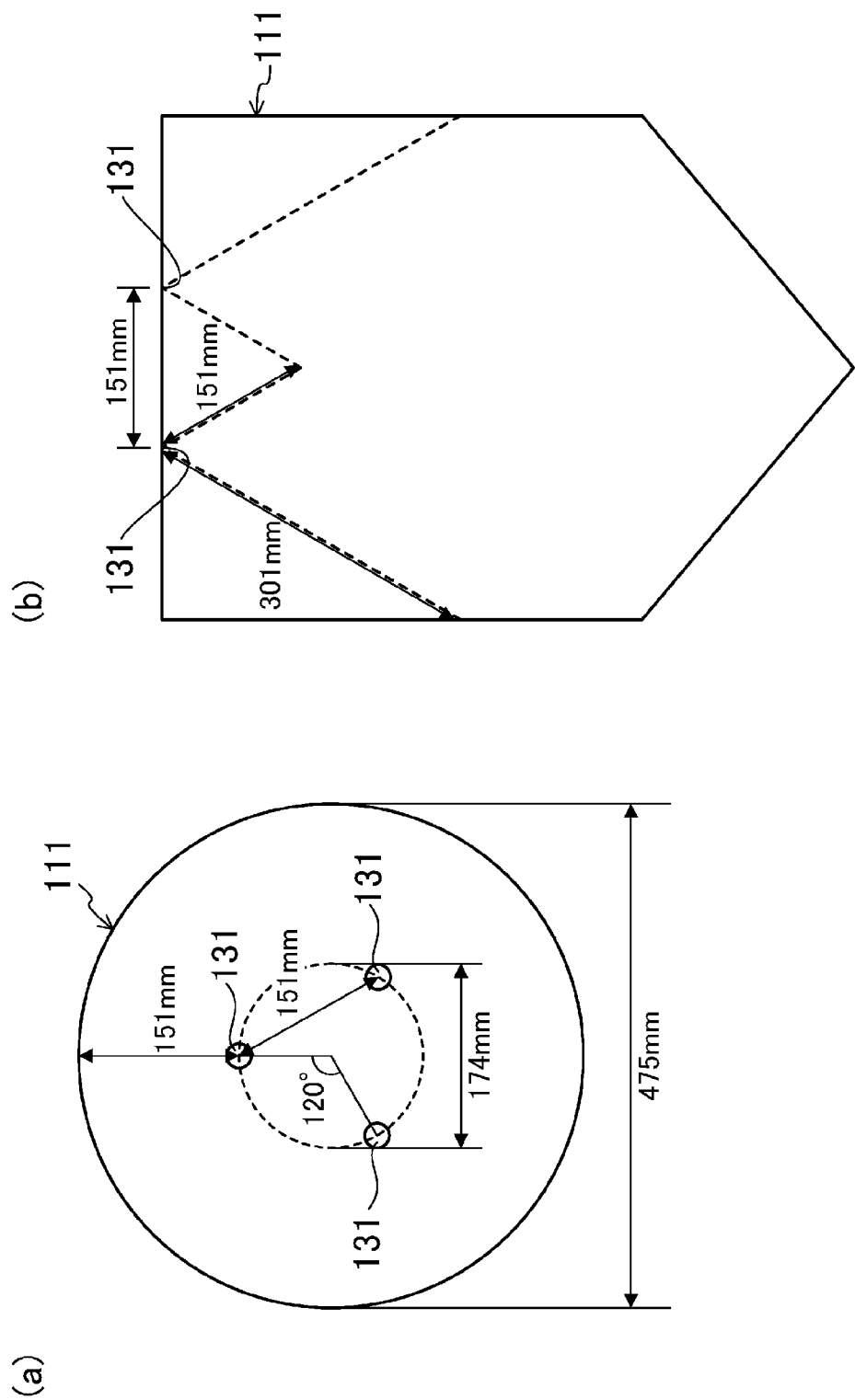
FIG. 7($a$) is a plan view showing a configuration of an upper vessel of a cooling device used in Example 2-4, and FIG. 7($b$) is a side view of the upper vessel.

FIGS. 7(a) and 7(b) show an upper vessel of a cooling device used in Example 2-4. Note that names indicated by reference characters are the same as those of the cooling device of the second embodiment.

The upper vessel 111 has an upper portion which is formed in the shape of a cylinder having an inner diameter of 475 mm and a lower portion which is formed in the shape of a cone whose diameter becomes smaller downward. The volume of the upper vessel 111 is 120 L.

Three spray nozzles A 131 are attached to the top plate of the upper vessel 111. The three spray nozzles A 131 are arranged so that the centers of the nozzles are located at three respective vertices of an equilateral triangle with sides of 151 mm whose barycenter is located at the center of the top plate having a diameter of 475 mm. The spray outlet of each nozzle faces downward. Therefore, the three spray nozzles A 131 are equally spaced on a circle whose center is the center of the top plate, with the central angle of an arc between each nozzle being 120°. Note that the distance between the farthest points of adjacent spray nozzles A 131 from each other is 174 mm, and the shortest distance between the center of each spray nozzle A 131 and the inner wall of the upper vessel 111 is 151 mm. Each spray nozzle A 131 is connected to a corresponding liquid supply pipe (not shown).

In the cooling device including the above upper vessel 111 (the volume of the lower vessel is 420 L and the inner diameter of the connecting pipe is 160 mm), AS having a temperature of 75.3° C. was supplied from the liquid supply pipes through the spray nozzles A 131 to the upper vessel 111 at a flow rate of 2.9 ton/hr (the volume flow rate of the liquid per nozzle was 0.00025 m$^3$/s). Also, the cooling device was evacuated through the gas discharge pipe of the upper vessel. The atmosphere having the pressure was maintained at 20.0 kPa in the upper vessel, the connecting pipe, and the lower vessel. The running time was 6.5 min.

As a result, the density under vacuum and the temperature of the AS stored and retained in the lower vessel were 0.75 kg/L and 59.8° C., respectively.

Here, the spray angle of the spray nozzle A 131 is 60° and the nozzle-to-nozzle distance is 151 mm. Therefore, the flying distance is shortest (0.151 m) when AS streams sprayed from the spray nozzles A131 contact each other, and 0.301 m when the AS sprayed from the spray nozzles A131 contacts the inner wall of the upper vessel 111. Therefore, the flying distance of 100 volume % of the AS was calculated as 0.151 m or more. The spray speed (initial speed) of the AS was calculated as 3.8 m/s. By dividing the flying distance by the spray speed, the flying time was calculated as 0.040 sec. The spray speed and the supply area of the AS were calculated in the same manner as that of Example 2-2.

COMPARATIVE EXAMPLE 2-1

In a cooling device having the configuration of FIG. 3 (the inner diameter of the upper vessel is 475 mm, the volume of the upper vessel is 270 L, the volume of the lower vessel is 420 L, and the inner diameter of the connecting pipe is 160 mm), a spray nozzle C available from Spraying Systems Co., Japan under the trade name "Spiral Jet B3/8HHSJ-SS12030" was attached to a tip of the upper one of the two liquid supply pipes. Thereafter, AS having a temperature of 72.8° C. was supplied from the liquid supply pipes through the spray nozzle C to the upper vessel at a flow rate of 3.0 ton/hr (the volume flow rate of the liquid per nozzle was 0.00077 m$^3$/s). Also, the cooling device was evacuated through the gas discharge pipe of the upper vessel. The atmosphere having the pressure was maintained at 20.0 kPa in the upper vessel, the connecting pipe, and the lower vessel. The running time was 15.7 min.

As a result, the density under vacuum and the temperature of the AS stored and retained in the lower vessel were 0.17 kg/L and 60.7° C., respectively.

Here, as in Example 2-1, the flying distance of 100 volume % of the AS was calculated as 0.274 m. The spray speed (initial speed) of the AS was calculated as 11.0 m/s. By dividing the flying distance by the spray speed, the flying time was calculated as 0.025 sec. The spray speed and the supply area of the AS were calculated the same manner as that of Example 2-1.

EXAMPLE 2-5

In a cooling device having the configuration of FIG. 3 (the inner diameter of the upper vessel is 475 mm, the volume of the upper vessel is 270 L, the volume of the lower vessel is 420 L, and the inner diameter of the connecting pipe is 160 mm), a spray nozzle D available from Spraying Systems Co., Japan under the trade name "Spiral Jet B1/2HHSJ-SS60120" was attached to a tip of each of the two liquid supply pipes. Thereafter, a fluid having a temperature of 77.2° C. and a density of 0.61 kg/L which is AS containing or entraining bubbles (hereinafter referred to as "bubble-entrained AS") was supplied from the liquid supply pipes through the spray nozzles D to the upper vessel at a flow rate of 3.7 ton/hr (the volume flow rate of the liquid per nozzle was 0.00083 $m^3$/s). Also, the cooling device was evacuated through the gas discharge pipe of the upper vessel. The atmosphere having the pressure was maintained at 20.0 kPa in the upper vessel, the connecting pipe, and the lower vessel. The running time was 4.4 min.

As a result, the density under vacuum and the temperature of the AS stored and retained in the lower vessel were 0.75 kg/L and 60.1° C., respectively.

Here, the spray angle of the spray nozzle was 60° and the inner diameter of the upper vessel was 475 mm, and therefore, the flying distance of 100 volume % of the bubble-entrained AS was calculated as 0.475 m. The spray speed (initial speed) of the bubble-entrained AS was calculated as 4.6 m/s. By dividing the flying distance by the spray speed, the flying time was calculated as 0.103 sec. The spray speed and the supply area of the bubble-entrained AS were calculated in the same manner as that of Example 2-1. Note that the outer diameter D of the opening area of the spray nozzle D at the start point (base end) was 9.2 mm, the outer diameter d at the end point was 7.6 mm, and the width δ is 6.9 mm, and the area was calculated as 0.000182 $m^2$.

EXAMPLE 2-6

The same cooling device as that used in Example 2-5 was prepared. Thereafter, bubble-entrained AS having a temperature of 67.5° C. was supplied from the liquid supply pipes through the spray nozzles D to the upper vessel at a flow rate of 4.2 ton/hr (the volume flow rate of the liquid per nozzle was 0.00094 $m^3$/s). The atmosphere having the pressure was maintained at 20.0 kPa in the upper vessel, the connecting pipe, and the lower vessel. The running time was 3.7 min.

As a result, the density under vacuum and the temperature of the AS stored and retained in the lower vessel were 0.40 kg/L and 61.6° C., respectively.

Here, as in Example 2-5, the flying distance of 100 volume % of the bubble-entrained AS was calculated as 0.475 m. The spray speed (initial speed) of the bubble-entrained AS was calculated as 5.2 m/s. By dividing the flying distance by the spray speed, the flying time was calculated as 0.091 sec. The spray speed and the supply area of the bubble-entrained AS were calculated in the same manner as that of Example 2-5.

COMPARATIVE EXAMPLE 2-2

The same cooling device as that used in Comparative Example 2-1 was prepared.

Thereafter, bubble-entrained AS having a temperature of 74.0° C. was supplied from the liquid supply pipes through the spray nozzle C to the upper vessel at a flow rate of 3.0 ton/hr (the volume flow rate of the liquid per nozzle was 0.00137 $m^3$/s). The atmosphere having the pressure was maintained at 20.0 kPa in the upper vessel, the connecting pipe, and the lower vessel. The running time was 5.1 min.

As a result, the density under vacuum and the temperature of the AS stored and retained in the lower vessel were 0.17 kg/L and 60.5° C., respectively.

Here, as in Comparative Example 2-1, the flying distance of 100 volume % of the bubble-entrained AS was calculated as 0.274 m. The spray speed (initial speed) of the bubble-entrained AS was calculated as 19.6 m/s. By dividing the flying distance by the spray speed, the flying time was calculated as 0.014 sec. The spray speed and the supply area of the bubble-entrained AS were calculated in the same manner as that of Comparative Example 2-1.

COMPARATIVE EXAMPLE 2-3

In a cooling device having the configuration of FIG. 3 (the inner diameter of the upper vessel is 475 mm, the volume of the upper vessel is 120 L, the volume of the lower vessel is 420 L, and the inner diameter of the connecting pipe is 160 mm), a dispersion plate was attached, instead of a spray nozzle, to a tip of the upper one of the two liquid supply pipes. Thereafter, bubble-entrained AS having a temperature of 75.2° C. was supplied from the liquid supply pipes through the dispersion plate to the upper vessel at a flow rate of 1.0 ton/hr (the volume flow rate of the liquid per nozzle was 0.00046 $m^3$/s). The atmosphere having the pressure was maintained at 20.0 kPa in the upper vessel, the connecting pipe, and the lower vessel. The running time was 5.0 min.

As a result, the density under vacuum and the temperature of the AS stored and retained in the lower vessel were 0.16 kg/L and 57.3° C., respectively.

Here, the flying distance of 100 volume % of the bubble-entrained AS was calculated as 0.130 m. The spray speed (initial speed) of the bubble-entrained AS was calculated as 19.1 m/s. By dividing the flying distance by the spray speed, the flying time was calculated as 0.007 sec. The spray speed of the bubble-entrained AS was calculated by dividing the volume flow rate of the bubble-entrained AS by the supply area of the bubble-entrained AS, i.e., the area of the spray outlet of the dispersion plate (0.000024 $m^2$).

TABLE 3

| | Examples | | | | | |
|---|---|---|---|---|---|---|
| | 2-1 | 2-2 | 2-3 | 2-4 | 2-5 | 2-6 |
| Inner Diameter Of First Vessel mm | 475 | 800 | 800 | 475 | 475 | 475 |
| (Spray) Nozzle | C | A | B | A | D | D |
| Number Of Nozzles | 2 | 1 | 1 | 3 | 2 | 2 |
| Spray Angle ° | 120 | 60 | 60 | 60 | 60 | 60 |
| Supply Area Of Liquid m² | 0.000070 | 0.000066 | 0.000238 | 0.000066 | 0.000182 | 0.000182 |
| Pressure In Device kPa | 20.0 | 20.0 | 20.0 | 20.0 | 20.0 | 20.0 |
| Liquid | AS | AS | AS | AS | Bubble-Entrained AS | Bubble-Entrained AS |
| Temperature Of Liquid ° C. | 75.7 | 77.8 | 80.2 | 75.3 | 77.2 | 67.5 |
| Flow Rate Of Liquid ton/hr | 2.7 | 1.0 | 5.3 | 2.9 | 3.7 | 4.2 |
| Volume Flow Rate of Liquid per Nozzle m³/s | 0.00035 | 0.00026 | 0.00135 | 0.00025 | 0.00083 | 0.00094 |
| Flying Distance m | 0.274 | 0.800 | 0.800 | 0.151 | 0.475 | 0.475 |
| Initial Speed m/s | 5.0 | 3.9 | 5.7 | 3.8 | 4.6 | 5.2 |
| Flying Time s | 0.055 | 0.205 | 0.140 | 0.040 | 0.103 | 0.091 |
| Running Time min | 5.4 | 12.4 | 3.8 | 6.5 | 4.4 | 3.7 |
| Density Under Vacuum After Cooling kg/L | 0.81 | 0.88 | 0.84 | 0.75 | 0.75 | 0.40 |
| Temperature After Cooling ° C. | 59.7 | 62.2 | 62.8 | 59.8 | 60.1 | 61.6 |
| Density Under Atmospheric Pressure After Cooling kg/L | 1.08 | — | — | — | — | — |

TABLE 4

| | Comparative Examples | | |
|---|---|---|---|
| | 2-1 | 2-2 | 2-3 |
| Inner Diameter Of First Vessel mm | 475 | 475 | 475 |
| (Spray) Nozzle | C | C | Dispersion Plate |
| Number Of Nozzles | 1 | 1 | — |
| Spray Angle ° | 120 | 120 | — |
| Supply Area Of Liquid m² | 0.000070 | 0.000070 | 0.000024 |
| Pressure In Device kPa | 20.0 | 20.0 | 20.0 |
| Liquid | AS | Bubble-Entrained AS | Bubble-Entrained AS |
| Temperature Of Liquid ° C. | 72.8 | 74.0 | 75.2 |
| Flow Rate Of Liquid ton/hr | 3.0 | 3.0 | 1.0 |
| Volume Flow Rate of Liquid per Nozzle m³/s | 0.00077 | 0.00137 | 0.00046 |
| Flying Distance m | 0.274 | 0.274 | 0.130 |
| Initial Speed m/s | 11.0 | 19.6 | 19.1 |
| Flying Time s | 0.025 | 0.014 | 0.007 |
| Running Time min | 15.7 | 5.1 | 5.0 |
| Density Under Vacuum After Cooling kg/L | 0.17 | 0.17 | 0.16 |
| Temperature After Cooling ° C. | 60.7 | 60.5 | 57.3 |
| Density Under Atmospheric Pressure After Cooling kg/L | — | — | — |

<Manufacture of Anionic Surfactant Aqueous Solution>

A sodium alkylsulfate (anionic surfactant) was manufactured by a neutralization device having the configuration of FIG. 5. A spray nozzle E available from Spraying Systems Co., Japan under the trade name "Spiral Jet B1/2HHSJ-316L60120" was attached to the inside of the cooling tank. Alkyl sulfuric acid (an acid precursor of an anionic surfactant), 27.0 mass % sodium hydroxide aqueous solution (alkali), and 20.0 mass % sodium carbonate aqueous solution (buffering agent) were supplied to the material supply unit, where the amounts of these components were 0.63 parts by mass, 0.34 parts by mass, and 0.10 parts by mass, respectively, with respect to 1 part by mass of the sodium alkylsulfate aqueous solution to be collected through the product collection pipe. The atmosphere having the pressure in the cooling tank was maintained at 20.0 kPa by evacuation through the gas discharge pipe. The flow rate of the AS supplied to the cooling tank was 3.0 ton/hr (volume flow rate: 0.00078 m³/s) per spray nozzle. The circulation ratio was 4.2 times.

Here, the flying distance of 100 volume % of the sodium alkylsulfate aqueous solution was calculated as 0.470 m. The spray speed (initial speed) of the sodium alkylsulfate aqueous solution was calculated as 4.3 m/s. By dividing the flying distance by the spray speed, the flying time was calculated as 0.109 sec or more.

Note that the outer diameter D of the opening area of the spray nozzle E at the start point (base end) was 9.2 mm, the outer diameter d at the end point was 7.6 mm, and the width δ is 6.9 mm, and the area was calculated as 0.000182 m².

In this manufacture of sodium alkylsulfate, the temperature and the density of the sodium alkylsulfate aqueous solution were 74.2° C. and 1.07 kg/L (under atmospheric pressure), respectively, upstream of the cooling tank. The temperature and the density of the sodium alkylsulfate aqueous solution were 62.8° C. and 0.80 kg/L (under vacuum), respectively, downstream of the cooling tank. The sodium alkylsulfate concentration and the density of the sodium alkylsulfate aqueous solution collected through the product collection pipe were 65.0 mass % and 1.07 kg/L (under atmospheric pressure), respectively.

INDUSTRIAL APPLICABILITY

The present invention is useful for a method for cooling liquid and a method for manufacturing a cooled anionic surfactant aqueous solution in that method.

DESCRIPTION OF REFERENCE CHARACTERS

100 COOLING DEVICE
111 UPPER VESSEL (COOLING TANK)
112 LOWER VESSEL
113 CONNECTING PIPE
121 LIQUID SUPPLY PIPE
122 FIRST GAS INTRODUCTION PIPE
123 (FIRST) GAS DISCHARGE PIPE
124 SECOND GAS DISCHARGE PIPE
125 SECOND GAS INTRODUCTION PIPE
126 LIQUID DISCHARGE PIPE
127 THIRD GAS INTRODUCTION PIPE
131 SPRAY NOZZLE (LIQUID SUPPLY UNIT)
141 EVACUATION PUMP
200 NEUTRALIZATION DEVICE
210 CIRCULATION PATH
220 CIRCULATION PUMP
230 MATERIAL MIXER
231 ACID SUPPLY PIPE
232 ALKALI SUPPLY PIPE
240 HEAT REMOVAL COOLER
241 COOLING TANK
242 SPRAY NOZZLE
243 GAS DISCHARGE PIPE
244 GAS INTRODUCTION PIPE
250 PRODUCT COLLECTION PIPE

The invention claimed is:

1. A method for cooling a liquid containing a volatile component and 10 to 99 mass % of a surfactant by supplying the liquid to an atmosphere in a cooling device, the atmosphere having a pressure which is lower than or equal to the saturated vapor pressure of the volatile component, and thereby vaporizing at least a portion of the volatile component, wherein
a flying time of the liquid defined as a value obtained by dividing a flying distance of the liquid by an initial speed of the liquid represented by:

$$\text{the liquid initial speed} = \frac{\text{a volume flow rate of the liquid during supply}}{\text{a supply area of the liquid}} \quad (I)$$

is 0.030 sec or more, and
the liquid after cooling is continuously discharged from the cooling device by using an evacuation pump provided in the cooling device.

2. The method of claim 1, wherein
in a cooling tank containing the atmosphere having the pressure, the flying distance of the liquid whose flying time is 0.030 sec or more includes a distance over which the liquid flies during a period of time from when the liquid is supplied from a liquid supply unit to when the liquid contacts an inner wall of the cooling tank.

3. The method of claim 1, wherein
in a cooling tank containing the atmosphere having the pressure, the flying distance of the liquid whose flying time is 0.030 sec or more includes a distance over which the liquid flies during a period of time from when the liquid is supplied from a liquid supply unit to when the liquid contacts another liquid flying in the cooling tank.

4. The method of claim 1, wherein the volatile component contained in the liquid is water.

5. The method of claim 1, wherein the liquid is supplied using a spray nozzle.

6. The method of claim 1, wherein a temperature of the liquid before cooling is 0 to 80.2° C.

7. The method of claim 1, wherein a density under vacuum of the liquid after cooling is 0.3 to 2.0 kg/L.

8. The method of claim 1, wherein the surfactant comprises an anionic surfactant, and a concentration of the anionic surfactant in the collected liquid is 0.1 to 90 mass %.

9. The method of claim 1, wherein a content of the surfactant in the liquid is 50 to 99 mass %.

10. A method for manufacturing a cooled anionic surfactant aqueous solution, wherein
an anionic surfactant aqueous solution obtained by neutralization of an acid precursor of an anionic surfactant with an alkali is cooled in the method of claim 1, where the volatile component is water and the surfactant is the anionic surfactant.

11. A method for manufacturing a cooled anionic surfactant aqueous solution, wherein
an anionic surfactant aqueous solution obtained by neutralization of an acid precursor of an anionic surfactant with an alkali is cooled in the method of claim 1, where the volatile component is water and the surfactant is the anionic surfactant, wherein
a neutralization device is used which includes
a circulation path in which the anionic surfactant aqueous solution is circulated,
a material supply unit is provided in the circulation path and configured to continuously supply the acid precursor of the anionic surfactant and the alkali to the anionic surfactant aqueous solution circulating the circulation path,
a cooling unit is provided and inserted in the circulation path downstream of the material supply unit and configured to cool the anionic surfactant aqueous solution circulating in the circulation path, and
a collection unit is provided in the circulation path downstream of the cooling unit and configured to continuously collect a portion of the anionic surfactant aqueous solution circulating in the circulation path.

* * * * *